United States Patent
Ashizawa et al.

(10) Patent No.: US 9,184,677 B2
(45) Date of Patent: Nov. 10, 2015

(54) DRIVING DEVICE, LENS BARREL, AND IMAGE CAPTURING APPARATUS

(75) Inventors: Takatoshi Ashizawa, Yokohama (JP); Kunihiro Kuwano, Kawasaki (JP); Masamitsu Kimura, Yokosuka (JP)

(73) Assignee: NIKON CORPORATION, Tokyo (JP)

( * ) Notice: Subject to any disclaimer, the term of this patent is extended or adjusted under 35 U.S.C. 154(b) by 74 days.

(21) Appl. No.: 13/311,008

(22) Filed: Dec. 5, 2011

(65) Prior Publication Data
US 2012/0177354 A1 Jul. 12, 2012

(30) Foreign Application Priority Data

Dec. 6, 2010 (JP) .................................. 2010-271703
May 23, 2011 (JP) .................................. 2011-114821

(51) Int. Cl.
| | |
|---|---|
| H02N 2/00 | (2006.01) |
| G02B 27/10 | (2006.01) |
| H02N 2/02 | (2006.01) |
| H02N 2/06 | (2006.01) |
| G03B 3/10 | (2006.01) |

(52) U.S. Cl.
CPC ............ *H02N 2/004* (2013.01); *G02B 27/1006* (2013.01); *G03B 3/10* (2013.01); *H02N 2/026* (2013.01); *H02N 2/062* (2013.01); *G03B 2205/0061* (2013.01)

(58) Field of Classification Search
USPC ............... 396/133; 310/317, 328, 67 R, 68 R
See application file for complete search history.

(56) References Cited

U.S. PATENT DOCUMENTS

| | | | |
|---|---|---|---|
| 5,448,051 A * | 9/1995 | Yamano ...................... 250/201.2 |
| 7,701,116 B2 * | 4/2010 | Atsuta ........................... 310/317 |
| 2009/0066187 A1 | 3/2009 | Kudo | |
| 2009/0212662 A1 * | 8/2009 | Ashizawa ................ 310/323.03 |
| 2010/0141199 A1 * | 6/2010 | Shimada ....................... 318/696 |
| 2011/0043678 A1 | 2/2011 | Ueda et al. | |
| 2011/0141340 A1 | 6/2011 | Yumiki et al. | |

FOREIGN PATENT DOCUMENTS

| | | |
|---|---|---|
| EP | 2 270 571 A1 | 1/2011 |
| JP | A-01-179056 | 7/1989 |
| JP | A-2001-243478 | 9/2001 |
| JP | A-2002-199749 | 7/2002 |
| JP | A-2005-149368 | 6/2005 |
| JP | A-2008-182304 | 8/2008 |

(Continued)

OTHER PUBLICATIONS

Nov. 6, 2012 Japanese Office Action issued in Japanese Patent Application No. 2010-271703 (with translation).

(Continued)

*Primary Examiner* — Minh Phan
(74) *Attorney, Agent, or Firm* — Oliff PLC

(57) ABSTRACT

Provided is a lens barrel includes a vibration actuator that drives a focusing lens which brings a subject image into focus; an amplifying section that applies a pair of driving signals amplified to the vibration actuator; a phase shifting section that changes a phase difference between the pair of the driving signals; and a control section that, when a signal for giving an instruction to drive the vibration actuator is input, executes a first processing of causing the phase shifting section to perform an operation which periodically changes the phase difference of the pair of the driving signals.

10 Claims, 15 Drawing Sheets

(56) References Cited

FOREIGN PATENT DOCUMENTS

| | | |
|---|---|---|
| JP | A-2009-089586 | 4/2009 |
| JP | A-2009-153286 | 7/2009 |
| JP | A-2009-169013 | 7/2009 |
| JP | A-2010-233316 | 10/2010 |
| JP | A-2011-101559 | 5/2011 |
| WO | WO 2008/139723 A1 | 11/2008 |
| WO | WO 2009/130892 A1 | 10/2009 |

OTHER PUBLICATIONS

Apr. 9, 2013 Japanese Office Action issued in Japanese Patent Application No. 2011-114821 (with translation).

Apr. 27, 2015 Office Action issued in Chinese Patent Application No. 201110408077.9.

* cited by examiner

DRIVING DEVICE, LENS BARREL, AND IMAGE CAPTURING APPARATUS

CROSS-REFERENCE TO RELATED APPLICATION

Priority is claimed on Japanese Patent Application No. 2010-271703, filed on Dec. 6, 2010, and Japanese Patent Application No. 2011-114821, filed on May 23, 2011, the contents of which are incorporated herein by reference in its entirety.

BACKGROUND

1. Field of the Invention

The present invention relates to a driving device, a lens barrel, and an image capturing apparatus.

2. Description of Related Art

Conventionally, driving devices have been known that are used in a lens barrel or the like of an image capturing apparatus and drive a vibration actuator having a piezoelectric element (for example, refer to JP-A-2005-149368).

SUMMARY

However, in the driving device disclosed in JP-A-2005-149368, when the vibration actuator having the piezoelectric element is driven, there is a problem in that a sound is likely to be made from the vibration actuator having the piezoelectric element.

In an aspect of the present invention, its object is to provide a driving device, a lens barrel, and an image capturing apparatus capable of reducing sound which is made when the vibration actuator having the piezoelectric element is driven.

According to one aspect of the present invention, a driving device is provided that drives a vibration actuator having a piezoelectric element. The driving device includes a driving section that, when driving the piezoelectric element, drives the piezoelectric element by using a first time constant in a first time period, and drives the piezoelectric element by using a second time constant, of which the time constant value is smaller than that of the first time constant, in a second time period subsequent to the first time period.

According to one aspect of the present invention, a lens barrel includes the above-mentioned driving device.

According to one aspect of the present invention, an image capturing apparatus includes: the above-mentioned lens barrel; and an image capturing section that captures an image which is formed through the lens barrel.

According to one aspect of the present invention, a lens barrel includes: a vibration actuator that drives a focusing lens which brings a subject image into focus; an amplifying section that applies a pair of driving signals amplified to the vibration actuator; a phase shifting section that changes a phase difference between the pair of the driving signals; and a control section that, when a signal for giving an instruction to drive the vibration actuator is input, executes a first processing of causing the phase shifting section to perform an operation which periodically changes the phase difference of the pair of the driving signals.

In the aspect, a range of the phase difference of the pair of the driving signals is determined depending on a movement speed of the subject.

In the aspect, frequencies of the pair of the driving signals are determined depending on the movement speed of the subject.

In the aspect, when the signal for giving the instruction to drive the vibration actuator is input, before executing the first processing, the control section executes a second processing of changing amplitudes of the pair of the driving signals to a predetermined first amplitude and applying it to the vibration actuator, and executes a third processing of causing the amplifying section to perform an operation which increases the corresponding amplitudes of the pair of the driving signals up to a predetermined second amplitude greater than the corresponding first amplitude after the corresponding second processing while applying it to the vibration actuator. In addition, a time necessary for the third processing is longer than a time necessary for the second processing.

In the aspect, when stopping the vibration actuator, the control section causes the amplifying section to perform an operation which decreases the amplitudes of the pair of the driving signals from the second amplitude to the first amplitude and then stops applying the corresponding pair of driving signals.

In the aspect, a detection section is further provided that detects a position of the focusing lens. The control section determines whether or not a position of the focusing lens detected by the detection section is close to an in-focus position, if the focusing lens is positioned to be close to the corresponding in-focus position, the control section causes the phase shifting section to perform the operation which periodically changes the phase difference of the pair of the driving signals.

In the aspect, the focusing lens is shifted in an optical axis direction of the corresponding focusing lens without rotation.

According to one aspect of the present invention, an image capturing apparatus includes: a vibration actuator that drives a focusing lens which brings a subject image into focus; an amplifying section that applies a pair of driving signals amplified to the vibration actuator; a phase shifting section that changes a phase difference of the pair of the driving signals; and a control section that, when a signal for giving an instruction to drive the vibration actuator is input, executes a first processing of causing the phase shifting section to perform an operation which periodically changes the phase difference of the pair of the driving signals.

According to aspects of the present invention, it is possible to reduce the sound which is made when the vibration actuator having the piezoelectric element is driven.

Furthermore, according to aspects of the present invention, by suppressing noise made from the vibration wave actuator in the wobbling operation, it is possible to improve quietness.

DESCRIPTION OF EMBODIMENTS

Brief Overview of Embodiments According to the Present Invention

The inventors of the present invention found a problem that, in the wobbling operation during photographing of a moving image, when the focusing lens is shifted back and forth in small motions, if the pair of the driving signals is applied to the vibration wave motor (vibration wave actuator), faint noise is picked up by the microphone for detecting sound during photographing of the moving image. The reason was found to be that, when the amplitudes of the pair of the driving signals applied to the vibration wave motor are changed in a stepwise fashion from 0 [V] to a predetermined voltage, noise with various frequencies is made by the stator of the vibration wave motor, and audible sound will be recorded. It was found that, since the noise depends on the voltage with the amplitude changed in a stepwise fashion, the sound pressure of the noise tends to be lowered in accordance with the amplitude in a case where the voltage of the amplitude is small.

Therefore, the amplitude is changed in a stepwise fashion to an amplitude at which the noise, which is made when the pair of the driving signals is applied to the vibration wave motor, is smaller than the sound pressure detected through the microphone. Thereafter, the amplitudes of the pair of the driving signals is gradually changed to a predetermined voltage, for example, a rated voltage, and then by driving the vibration wave motor, noise is prevented from being detected.

Hereinafter, a vibration actuator, a lens barrel and a camera according to an embodiment of the present invention will be described with reference to drawings.

First Embodiment

Figure 1:
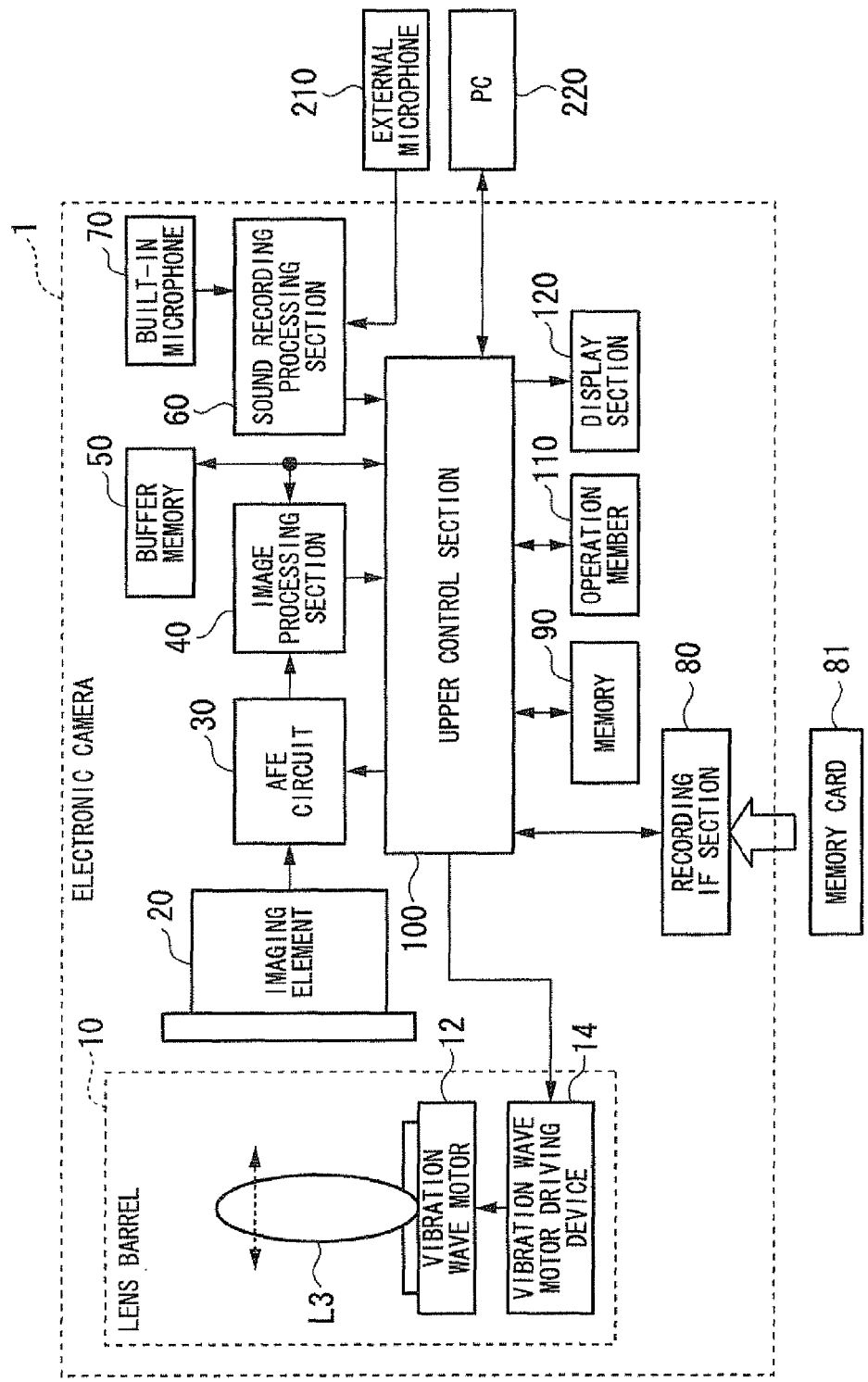
FIG. 1 is a schematic block diagram illustrating a configuration of an electronic camera 1 in a first embodiment.

FIG. 1 is a schematic block diagram illustrating a configuration of an electronic camera 1 in a first embodiment. As shown in the drawing, the electronic camera 1 includes: a lens barrel 10; an imaging element 20; an AFE (Analog Front End) circuit 30; an image processing section 40; a buffer memory 50; a sound recording processing section 60; a built-in microphone 70; a recording IF (Interface) section 80; a memory 90; an upper control section 100; an operation member 110; a display section 120. Furthermore, the electronic camera 1 can be connected to a PC (Personal Computer) 220 which is an external apparatus, and can be connected to an external microphone 210. Instead of the external microphone 210, a built-in microphone 70 can be used in the case of sound recording.

As described later, the lens barrel 10 has a plurality of optical lenses as an image capturing optical system, and forms a subject image on a light receiving surface of the image capturing device. In addition, in FIG. 1, the plurality of optical lenses is simplified, and is thus illustrated as a single lens. Furthermore, the lens barrel 10 includes an optical lens group including a third lens group (AF lens) L3; a vibration wave motor 12 as a vibration actuator; and a vibration wave motor driving device 14 as a vibration actuator driving device.

The imaging element 20 is constituted by CCD (Charge Coupled Device), CMOS (Complementary Metal Oxide Semiconductor), or the like in which the light receiving elements are two-dimensionally arranged on the light receiving surface. Furthermore, the imaging element 20 photoelectrically converts the subject image, which is acquired through the image capturing optical system belonging to the lens barrel 10, through the light receiving elements, generates an analog image signal, and outputs the signal to the AFE circuit 30.

The AFE circuit 30 performs gain adjustment (signal amplification depending on ISO (International Organization for Standardization) sensitivity) on the analog image signal which is output from the imaging element 20. Furthermore, the AFE circuit 30 performs amplification on the analog image signal in a predetermined range in accordance with ISO sensitivity setting information which is input from the upper control section 100, converts the analog image signal, which is amplified by a built-in A/D (Analog Digital) conversion circuit, into digital image data, and outputs the data to the image processing section 40.

The image processing section 40 performs various kinds of image processing such as noise processing, and the like on the digital image data which is output from the AFE circuit 30. The buffer memory 50 temporarily stores the digital image data in a process before or after the image processing which is performed on the digital image data by the image processing section 40.

The sound recording processing section 60 amplifies the sound signal which is detected by the built-in microphone 70 built in the electronic camera 1 or the external microphone 210 provided outside the electronic camera 1, and outputs the amplified signal as digital sound data to the upper control section 100. Furthermore, the sound recording processing section 60 detects that the external microphone 210 is connected thereto, outputs the signal, which represents that the external microphone 210 is connected, to the upper control section 100.

The recording IF section 80 is connected to a recording medium such as a memory card 81 so as to write and read data into and from the memory card 81. The memory 90 stores the captured digital image data.

The operation member 110 has a mode dial, an arrow key, a determination button, a release button, and the like, and outputs operation signals responding to the respective operations to the upper control section 100. Through the operation of the operation member 110 performed by a user, a still image photography mode is changed to a moving image photography mode.

The display section 120 is constituted by a liquid crystal panel, or the like, and displays data such as an operation menu and images input from the upper control section 100.

The upper control section 100 is constituted by a microprocessor, or the like, and integrally controls processing, which is performed by the electronic camera 1, by executing a program which is stored in ROM (Read Only Memory) or EEPROM (Electrically Erasable Programmable Read Only Memory) which are not shown in the drawing. Furthermore, the upper control section 100 performs, for example, an AF operation control, an AE (automatic exposure) operation control, an auto white balance control, and the like. Furthermore, the upper control section 100 outputs a driving command signal for driving the vibration wave motor 12 and photography information to the vibration wave motor driving device 14, which is belonging to the lens barrel 10, in the AF operation control.

Furthermore, the upper control section 100 is connected to the external PC 220. The PC 220 is connected to the upper control section 100 so as to thereby perform the reading or the like of the digital image data and the digital sound data stored in the memory 70 via the upper control section 100.

Here, the driving command signal is a signal for commanding to start the driving of the vibration wave motor 12. The photography information includes: a target position of the AF lens L3 that forms an image of the subject as an image capture target on the image capturing device; a movement direction, a movement speed and an acceleration rate of the subject. In addition, the upper control section 100 generates photography information by detecting the movement direction, the movement speed, and the acceleration rate of the subject through, for example, a heretofore known subject tracking function which is disclosed in Japanese Unexamined Patent Application Publication No. 2001-243478 or the like. Furthermore, the movement direction of the subject is a direction relative to the optical axis direction of the image capturing optical system.

Figure 2:
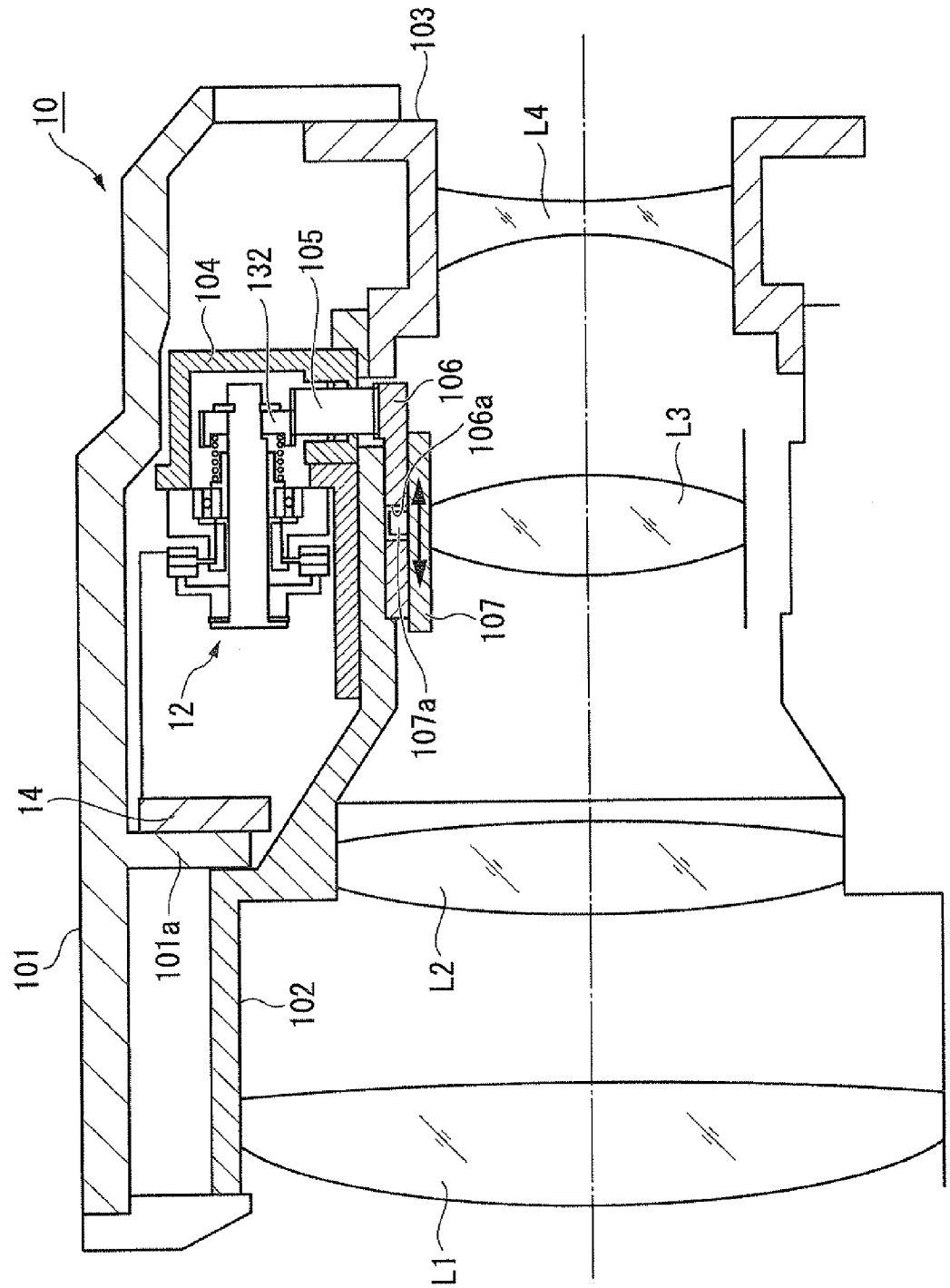
FIG. 2 is a schematic diagram illustrating a configuration of a lens barrel 10 in the same embodiment.

FIG. 2 is a schematic diagram illustrating a configuration of the lens barrel 10 in the same embodiment. The lens barrel 10 includes an external-side fixed barrel 101 that covers the outer circumferential portion of the lens barrel 10; a first inner-side fixed barrel 102 that is positioned closer to the subject side on the inner circumferential side than the external-side fixed barrel 101; and a second inner-side fixed barrel 103 that is positioned to the image side on the inner circumferential side than the external-side fixed barrel 101. Between the external-side fixed barrel 101 and the first inner-side fixed barrel 102, there are arranged the vibration wave motor 12, the vibration wave motor driving device 14, and a gear unit module 104 for decelerating and transferring the rotation speed of the vibration wave motor 12 are disposed, and fixed onto the first inner-side fixed barrel 102. The gear unit module 104 has a deceleration gear 105 that decelerates and transfers the power of the vibration wave motor 12.

Furthermore, in order from the subject side, the first lens group L1 and the second lens group L2 are fixed onto the first inner-side fixed barrel 102, and the fourth lens group L4 is fixed onto the second inner-side fixed barrel 103. Between the second lens group L2 and the fourth lens group L4, the third lens group L3, which is a focusing AF lens supported by an AF ring 107, is disposed. That is, the first lens group L1, the second lens group L2, the third lens group L3, and the fourth lens group L4 are sequentially arranged in order from the subject side toward the side of the image capturing device in the optical axis direction.

Between the AF ring 107 and the first inner-side fixed barrel 102, a cam ring 106 is provided to be rotatable about the optical axis as a center axis. The cam ring 106 is rotated by the power of the vibration wave motor 12 which is transferred through the deceleration gear 105. Furthermore, inside the cam ring 106, a key groove 106a is cut in a spiral shape in the circumferential direction. Furthermore, a fixing pin 107a is provided on the outer circumferential side of the AF ring 107, and the fixing pin 107a is inserted into the key groove 106a of the cam ring 106.

Furthermore, the vibration wave motor driving device 14 is disposed on a holding portion 101a which extends from the inner circumferential side of the external-side fixed barrel 101 to the inside. The vibration wave motor driving device 14 is electrically connected to the vibration wave motor 12 so as to thereby drive the vibration wave motor 12.

With the configuration of the above-mentioned lens barrel 10, by causing the power of the vibration wave motor 12 to rotate the cam ring 106 via the deceleration gear 105, it is possible to shift the fixing pin 107a along the key groove 106a and shift the AF ring 107 in the optical axis direction, and by stopping the cam ring 106, it is possible to stop the AF ring 107. That is, by driving the vibration wave motor 12, the AF ring 107 is driven in the optical axis direction, and the third lens group L3 is shifted. Thereby, it is possible to form a focused subject image on the image capturing device.

Figure 3:
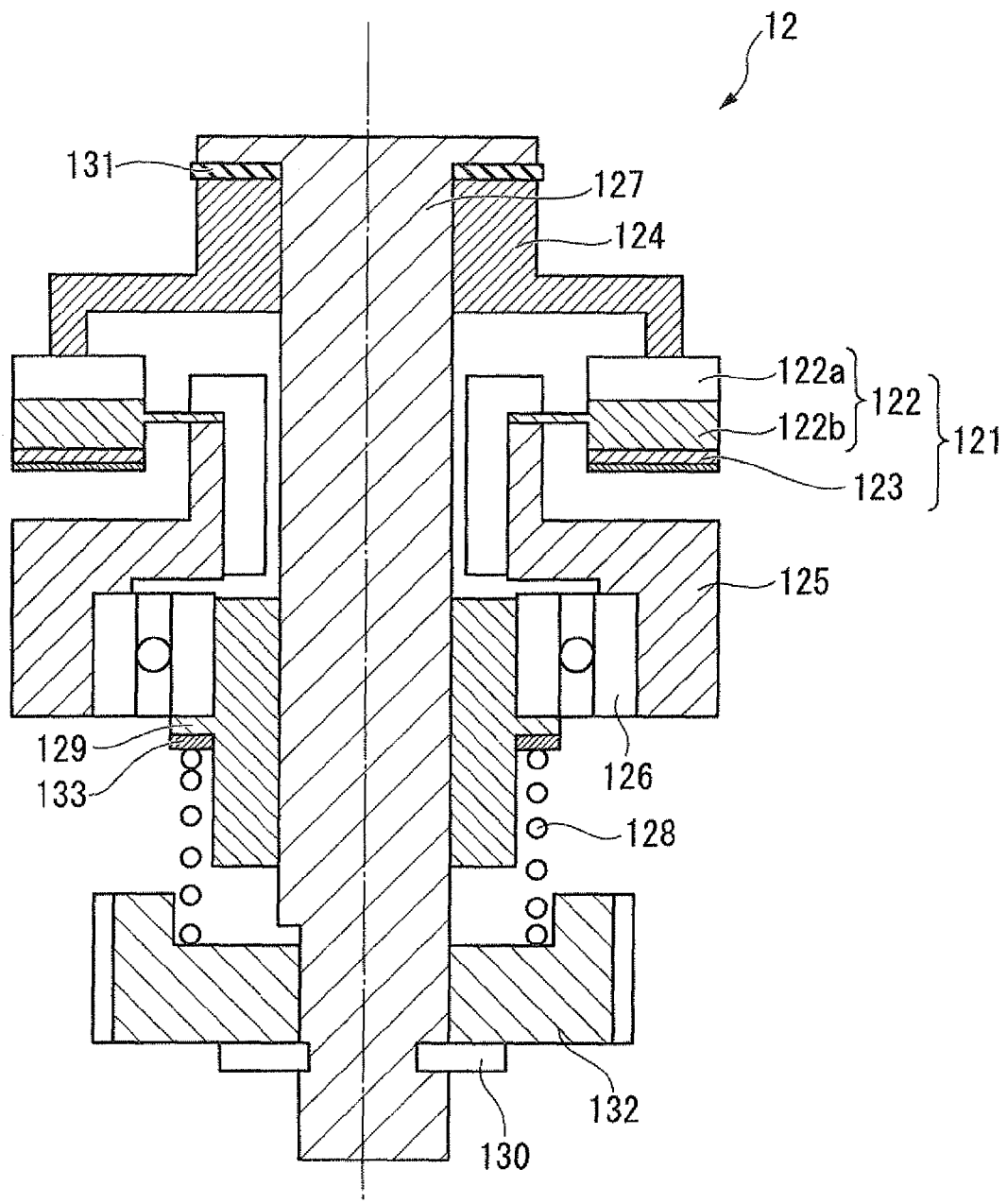
FIG. 3 is a schematic diagram illustrating a configuration of a vibration wave motor 12 in the same embodiment.

FIG. 3 is a schematic diagram illustrating a configuration of the vibration wave motor 12 in the same embodiment. The vibration wave motor 12 includes: a vibrator 121; a movable member 124; a fixing member 125; a bearing 126; an output shaft 127; a pressurizing member 128; a bearing receiving member 129, a stopper 130, a rubber member 131, a gear member 132; and a pressurizing force adjustment washer 133.

The vibrator 111 is formed of: an electromechanical transduction element (hereinafter referred to as a piezoelectric body 123) such as an electrostrictive element or a piezoelectric element that converts electrical energy into mechanical energy; and an elastic body 122 connected to the piezoelectric body 123. When a voltage is applied to the vibrator 121, for example, four traveling waves are generated. The elastic body 122 is formed of a metal material of which the resonance sharpness is large, and its shape is an annular shape. Furthermore, in the elastic body 122, a pectinate portion 122a, in which grooves are cut, is provided on the surface opposite to the surface to which the piezoelectric body 123 is bonded, the apical surface of the protrusion portion (location where there is no groove) thereof serves as a driving face, and thus the pectinate portion 122a comes into pressurized contact with the movable member 124. Here, the reason why the grooves are provided on the elastic body 122 is that, by making the neutral surface of the traveling wave as close as possible to the piezoelectric body 123 side, the amplitude of the traveling wave on the driving face of the elastic body 122 is amplified.

The piezoelectric body 123 is made from a material of lead zirconate titanate commonly known as PZT. However, recently in view of environmental issues, the piezoelectric body may be made from a lead-free material such as potassium sodium niobate, potassium niobate, sodium niobate, potassium barium titanate, bismuth sodium titanate, bismuth potassium titanate, or the like.

Furthermore, in the elastic body 122, a portion in which grooves are not provided is referred to as a base portion 122b.

The base portion 122b is bonded to the piezoelectric body 123, and surface treatment for lubrication is performed on the driving face of the elastic body 122. The piezoelectric body 123 is separated into two phases (A phase and B phase) along the circumferential direction. In each phase, polarization is alternately disposed for each ½ wavelength, and a space of ¼ wavelength is disposed to be vacant between the A-phase polarization and the B-phase polarization.

The movable member 124 is formed of a lightweight metal such as aluminum, and surface treatment for improving abrasion resistance is performed on the surface which comes into pressurized contact with the pectinate portion 122a. The output shaft 127 is combined with the movable member 124 via the rubber member 131 so as to be rotated together therewith. As the rubber member 131, butyl rubber or the like, which has a function of combining the movable member 124 and the output shaft 127 through adhesiveness of the rubber and a function of absorbing vibration in order not to transfer vibration from the movable member 124 to the output shaft 127, is appropriate.

The pressurizing member 128 is disposed between the bearing receiving member 129 and the gear member 132 fixed on the output shaft 127. The bearing receiving member 129 is inserted into the bearing 126, and the bearing 126 is inserted into the fixing member 125. The gear member 132 is inserted to be fit into the D cut of the output shaft 127, is fixed by the stopper 130 such as an E clip, and rotates together with the output shaft 127. Between the pressurizing member 128 and the bearing receiving member, the pressurizing force adjustment washer 133 is disposed.

As described above, the vibration wave motor 12 is configured such that the movable member 124 comes into pressurized contact with the driving face of the vibration body and the pressure applied between the movable member 124 and the pectinate portion 122a is adjusted to an appropriate pressurizing force by the pressurizing force adjustment washer 133 which is disposed between the pressurizing member 128 and the bearing receiving member 129.

Figure 4:
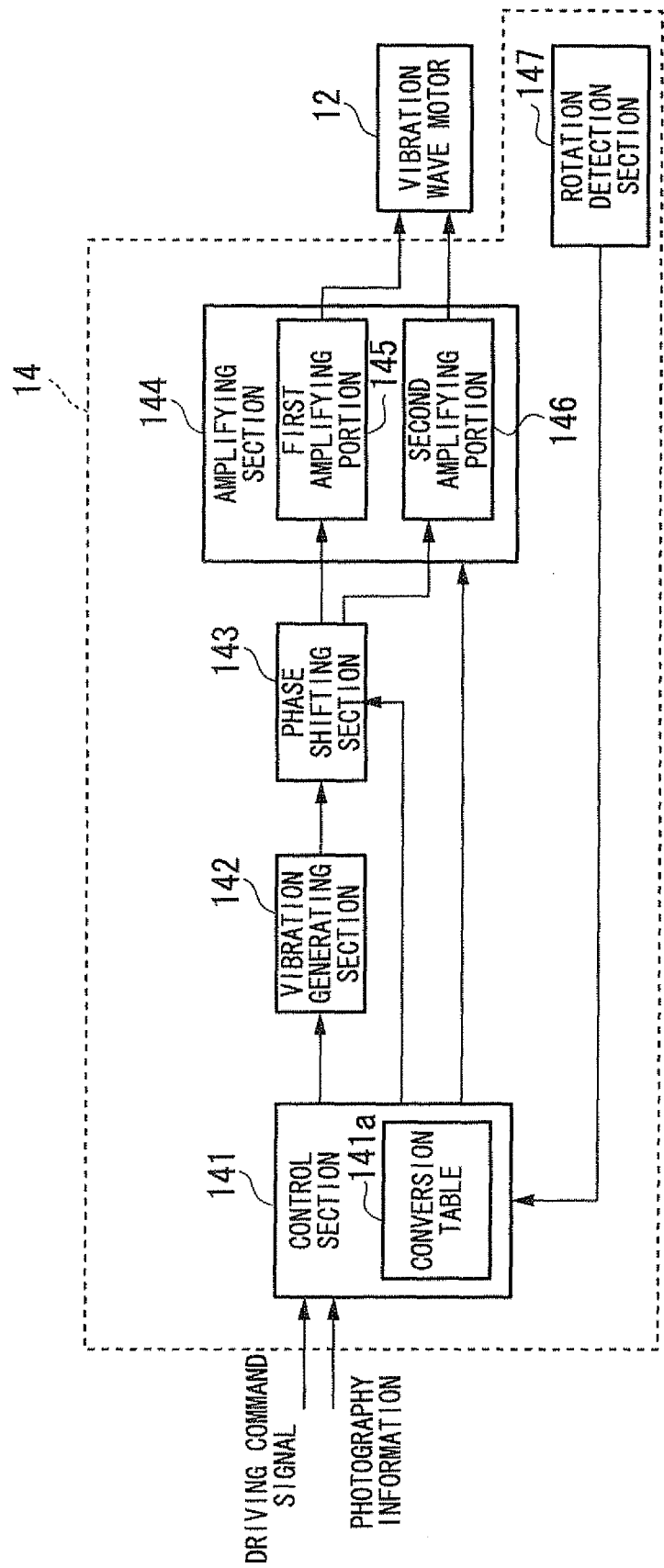
FIG. 4 is a schematic block diagram illustrating a configuration of a vibration wave motor driving device 14 in the same embodiment.

FIG. 4 is a schematic block diagram illustrating a configuration of the vibration wave motor driving device 14 in the same embodiment. The vibration wave motor driving device 14 includes a control section 141; a vibration generating section 142; a phase shifting section 143; an amplifying section 144; and a rotation detection section 147.

Furthermore, when the driving command signal is input from the upper control section 100 provided in the electronic camera 1, the vibration wave motor driving device 14 calculates, on the basis of the image capturing information input from the upper control section 100, the driving frequencies, which are frequencies of the pair of the driving signals Sa and Sb applied to the vibration wave motor 12, and the phase difference of the pair of the driving signals Sa and Sb. Then, the vibration wave motor driving device 14 drives the third lens group L3 as the focusing AF lens by applying the pair of the driving signals Sa and Sb, which has the calculated frequencies and phase difference, to the vibration wave motor 12 so as to thereby form an image of the subject on the image capturing device.

The vibration generating section 142 outputs an oscillation signal, which has a frequency depending on the frequency information input from the control section 141, to the phase shifting section 143.

The phase shifting section 143 generates, on the basis of the phase difference information input from the control section 141, a signal with a phase difference, which is represented by the phase difference information, relative to the oscillation signal input from the vibration generating section 142, and outputs the input oscillation signal to the amplifying section 144.

The amplifying section 144 has a first amplifying portion 145 and a second amplifying portion 146. The first amplifying portion 145 receives an input of the oscillation signal from the phase shifting section 143 and amplification factor information from the control section 141. Furthermore, the first amplifying portion 145 amplifies the amplitude of the input oscillation signal on the basis of the input amplification factor information, and applies the amplified oscillation signal, which is the driving signal Sa, to the piezoelectric body 123 (FIG. 3) of the vibration wave motor 12.

The signal with phase difference, which is represented by the phase difference information, relative to the oscillation signal and the amplification factor information from the control section 141 are input to the second amplifying portion 146. Furthermore, the second amplifying portion 146 amplifies the signal with the input phase difference on the basis of the input amplification factor information, and applies the amplified signal, which is the driving signal Sb, to the piezoelectric body 123 of the vibration wave motor 12.

Furthermore, the first amplifying portion 145 and the second amplifying portion 146 apply the driving signals Sa and Sb of which the amplitudes are $V_0$ [V] (first amplitude) to the vibration wave motor 12, and subsequently increase the amplitudes of the driving signals Sa and Sb to $V_1$ [V] (second amplitude) on the basis of the amplification factor information which is input from the control section 141.

Here, the amplitude (peak voltage) $V_0$ [V] is a voltage value which is required by simulation and measurement using real machines, and is an amplitude (voltage) in which noise is not detected by the built-in microphone 70 even when the amplitudes of the driving signals Sa and Sb are changed from 0 to $V_0$ [V]. Furthermore, the amplitude (peak voltage) $V_1$ [V] is, for example, a rated voltage of the vibration wave motor 12. Furthermore, the pair of the driving signals Sa and Sb, which are respectively output from the first amplifying portion 145 and the second amplifying portion 146, have frequencies the same as that of the oscillation signal.

The rotation detection section 147 is constituted by an optical encoder, a magnetic encoder, or the like, and detects the movement speed and the position of the vibration wave motor 12, and outputs the detection information representing the detected value to the control section 141.

The control section 141 has a conversion table 141a. The conversion table 141a stores, in advance, information of two phase differences of the pair of the driving signals Sa and Sb, which are applied to the vibration wave motor, corresponding to photography information, which is input from the upper control section 100 provided in the electronic camera 1, and the detection information which is input from the rotation detection section 147. The phase differences stored in the conversion table 141a are values which are obtained on the basis of practical measurement results or simulation, and values corresponding to combination of the respective parameters and the target position, the movement direction, movement speed, and acceleration rate of the subject, and the position and rotation speed of the vibration wave motor which are included in the photography information. Furthermore, the two phase differences are at the maximum and the minimum when the phase differences of the driving signals Sa and Sb are periodically changed.

When the driving command signal is input from the upper control section 100, the control section 141 outputs frequency information presenting the predetermined frequency to the vibration generating section 142, and outputs the amplification factor information corresponding to the amplitude $V_0$ [V] to the amplifying section 144. Furthermore, when the driving command signal is input from the upper control section 100, the control section 141 determines the rotation direction of the vibration wave motor 12 based on the target position included in the photography information and the detection information input from the rotation detection section 147, and outputs the phase difference information, which represents which one of +90 degrees or −90 degrees is selected, to the phase shifting section 143 in accordance with the determined rotation direction. The predetermined frequency is a frequency which is higher than the frequency range in which the vibration wave motor 12 is driven by the driving signals Sa and Sb.

Thereafter, the control section 141 changes the amplification factor information which is output to the amplifying section 144, and increases the amplitudes of the driving signals Sa and Sb from $V_0$ [V] to $V_1$ [V]. Moreover, the control section 141 performs sweeping processing of lowering the frequencies of the driving signals Sa and Sb up to the frequency range capable of driving the vibration wave motor 12, thereby driving the vibration wave motor 12.

Furthermore, when the vibration wave motor 12 starts moving and the AF lens L3 is positioned in an appropriate focus range in the vicinity of the focal point, the control section 141 controls the wobbling operation. Specifically, two phase differences corresponding to the input image capturing information and detection information are read from the conversion table 141a, and the phase difference information is changed such that the two phase differences are at peaks (the maximum value and the minimum value), thereby changing the phase differences of the driving signals Sa and Sb which are output to the phase shifting section 143.

In addition, whether or not the AF lens L3 is positioned in the appropriate focus range is determined on the basis of the target position included in the photography information and the position of the vibration wave motor 12 included in the detection information. Since the position of the vibration wave motor 12 and the position of the AF lens L3 are correlated with each other, the control section 141 calculates the position of the AF lens L3 from the position of the vibration wave motor 12 by using a predetermined coefficient.

As described above, the control section 141 controls the vibration generating section 142, the phase shifting section 143, and the amplifying section 144 on the basis of the image capturing information and detection information, thereby driving the vibration wave motor 12. In addition, the appropriate focus range is a range including a focal point by which an image of the subject is formed on the image capturing device, and is a range which is determined in advance by simulation, measurement using a real machine, and the like. Furthermore, when the AF lens L3 is positioned in the appropriate focus range, a range is determined in advance in which blurring occurring in the image of the subject formed on the image capturing device is not recognized by a user. The control section 141 drives the vibration wave motor 12 such that the AF lens L3 position is within the appropriate focus range during photographing of the moving image.

Hereinafter, description will be given of basic operations performed when the vibration wave motor driving device 14 drives the vibration wave motor 12.

When the driving command signal is input from the upper control section 100, the control section 141 outputs the frequency information to the vibration generating section 142, outputs the phase difference information to the phase shifting section 143, and outputs the amplification factor information to the amplifying section 144.

The vibration generating section 142 generates the oscillation signal with the frequency which is represented by the frequency information input from the control section 141, and outputs the signal to the phase shifting section 143. When the oscillation signal is input from the vibration generating section 142, the phase shifting section 143 outputs the corresponding oscillation signal to the first amplifying portion 145, generates a signal with a phase difference which is represented by the input phase difference information from the control section 141, for example, a phase difference of 90 degrees, and outputs the generated signal to the second amplifying portion 146. Each of the first amplifying portion 145 and the second amplifying portion 146 amplifies the oscillation signal which is input from the phase shifting section 143, and applies the driving signals Sa and Sb to the vibration wave motor 12. The piezoelectric body 123 is excited by applying the driving signal Sa to the A-phase electrode and applying the driving signal Sb to the B-phase electrode, whereby 4th-order bending vibration occurs in the elastic body 122.

When the driving signals Sa and Sb are respectively applied to the A phase and B phase, the piezoelectric body 123 generates the 4th-order bending vibration caused from the A phase and the 4th-order bending vibration caused from the B phase. The two bending vibrations are deviated by ¼ wavelength, and are synthesized, thereby generating four traveling waves. Due to the elliptical motion of the crest of the traveling wave, the movable member 124, which is in pressurized contact with the driving face of the elastic body 122, is driven to be frictionally rotated, and the rotation motion generated in the vibration wave motor 12 is transferred to the output shaft 127, the gear member 132 (FIG. 3), the deceleration gear 105, and the cam ring 106, thereby moving the AF ring 107 in the optical axis direction.

The rotation detection section (a position detection section) 147 detects the position and movement speed of the vibration wave motor 12, and outputs the detection information, which represents the detected position and movement speed, to the control section 141. When the AF lens L3 is positioned in the appropriate focus range, the control section 141 performs control for driving the vibration wave motor 12 by calculating the next phase difference information on the basis of the detection information, which is input from the rotation detection section 147, and the photography information, which is input from the upper control section 100 for each wobbling cycle which is a predetermined cycle.

Figure 5:
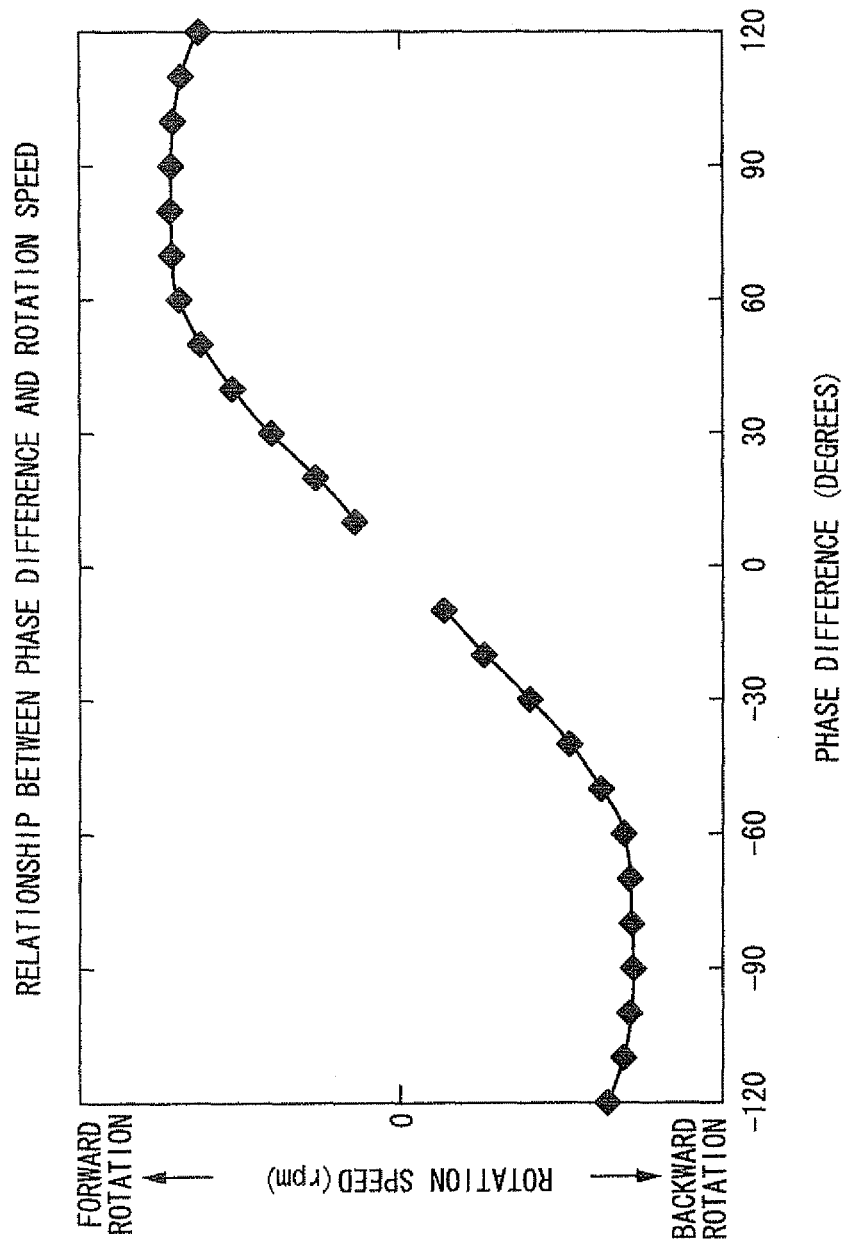
FIG. 5 is a diagram illustrating a relationship between phase differences of driving signals, which are applied to the vibration wave motor 12, and a rotation speed of the vibration wave motor 12.

FIG. 5 is a diagram illustrating a relationship between the phase differences of the driving signals, which are applied to the vibration wave motor 12, and the rotation speed of the vibration wave motor 12. The rotation speed of the vibration wave motor 12 becomes the maximum speed in the forward rotation direction when the phase difference is +90 degrees, and becomes the maximum speed in the backward direction when the phase difference is −90 degrees. Furthermore, the rotation speed of the vibration wave motor 12 is changed depending on the phase difference.

The vibration wave motor driving device 14 of the embodiment performs the wobbling operation during photographing of a moving image by controlling the rotation speed of the vibration wave motor 12 on the basis of the phase differences of the driving signals Sa and Sb.

Hereinafter, regarding the operations in the case of photographing a moving image in the embodiment, the following three cases will be described with reference to the diagram chronologically illustrating the relationship among the frequencies, voltages (amplitudes), and phase differences of the driving signals Sa and Sb, the rotation speed of the vibration wave motor 12, and the AF lens position. Here, a description will be given of the case of driving the vibration wave motor 12 in the forward rotation direction.

1. Case Where Subject Remains Stationary
2. Case Where Subject Is Moving at Constant Speed
3. Case Where Subject Remaining Stationary Starts Moving at Constant Acceleration Rate

[1. Case where Subject Remains Stationary]

Figure 6:
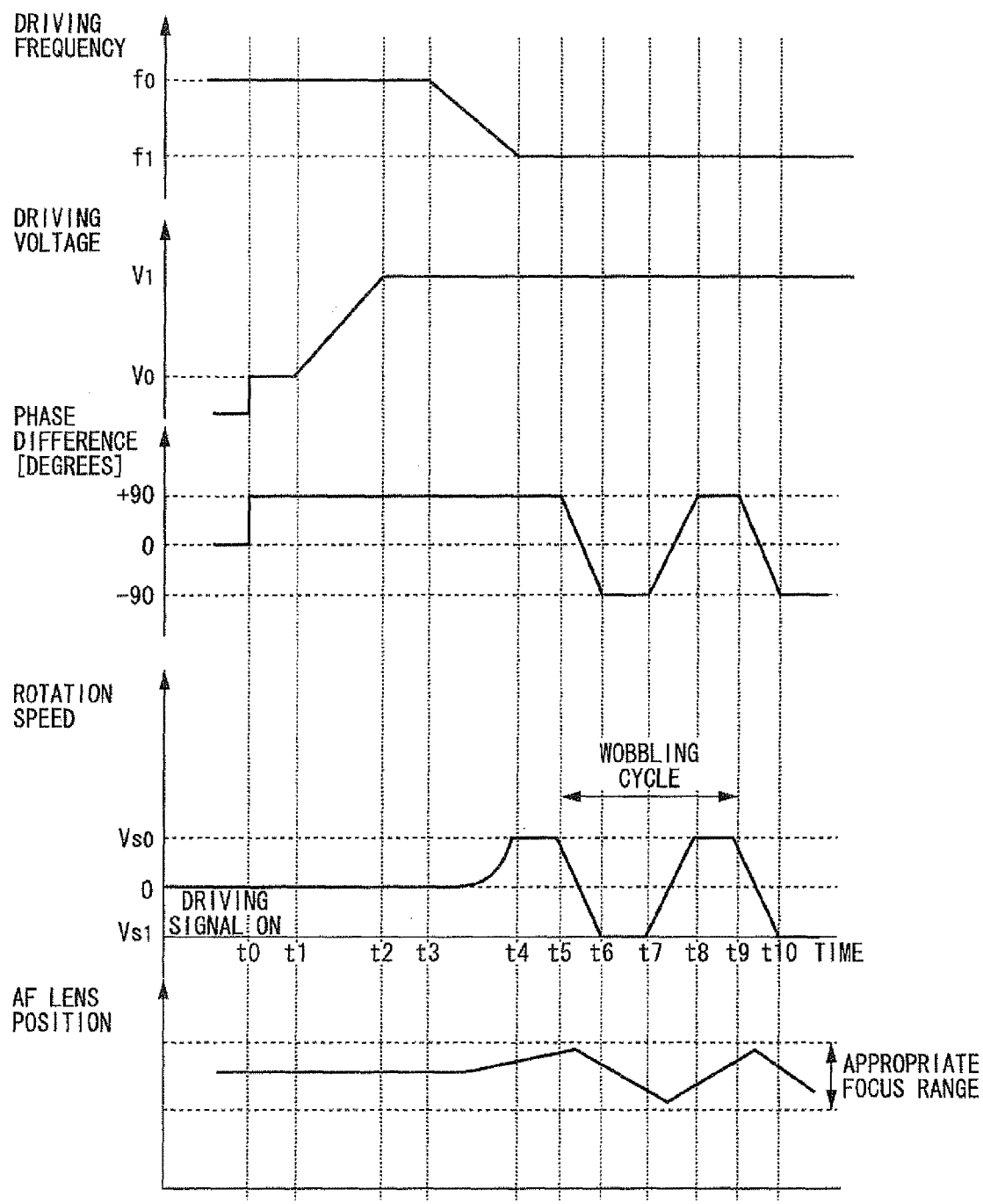
FIG. 6 is a diagram chronologically illustrating an example of a relationship among driving frequencies, amplitudes (driving voltages), and phase differences of the driving signals Sa and Sb, a rotation speed of the vibration wave motor 12, and an AF lens position in a case where a subject remains stationary in the same embodiment.

FIG. 6 is a diagram chronologically illustrating an example of a relationship among driving frequencies, amplitudes (driving voltages), and phase differences of the driving signals Sa and Sb, a rotation speed of the vibration wave motor 12, and an AF lens position in a case where a subject remains stationary in the same embodiment.

First, when the instruction to start photographing a moving image is input through the operation member 110 by user's operation, the upper control section 110 outputs the driving command signal and the photography information to the vibration wave motor control section 14. When the driving command signal is input, the vibration wave motor control section 14 selects a predetermined driving frequency f0 (maximum frequency) and a driving voltage $V_0$ (minimum voltage), outputs the frequency information, which represents the driving frequency f0, to the vibration generating section 142, and outputs the amplification factor information, which represents the amplification factor depending on the driving voltage $V_0$ to the driving section. Furthermore, the vibration wave motor control section 14 determines the rotation direction of the vibration wave motor 12 on the basis of the input detection information and the target position included in photography information, and outputs the phase difference information, which represents a predetermined initial value of the phase difference based on the rotation direction, to the phase shifting section 143. As the initial value of the phase difference, +90 degrees is selected in the case of the forward rotation direction, and −90 degrees is selected in the case of the backward rotation direction.

The vibration generating section 142 outputs the oscillation signal of the input driving frequency f0 to the phase shifting section 143. The phase shifting section 143 outputs the input oscillation signal and the signal, which has the phase difference based on the phase difference information relative to the input oscillation signal, to the amplifying section 144. In the amplifying section 144, the first amplifying portion 145 applies the driving signal Sa to the vibration wave motor 12 on the basis of the input oscillation signal and the amplification factor information. The second amplifying portion 146 applies the driving signal Sb to the vibration wave motor 12 on the basis of the signal with the input phase difference and the amplification factor information. Thereby, the vibration wave motor control section 14 applies the pair of the driving signals Sa and Sb, of which the amplitudes are $V_0$ and in which the driving signal Sb has a phase difference of +90 degrees relative to the driving signal Sa, to the vibration wave motor 12. At this time, the control section 141 changes the driving voltages of the driving signals Sa and Sb from 0 [V] to $V_0$ [V] in a stepwise fashion (time t0).

From the time t1 to the time t2, the control section 141 gradually increases the driving voltages of the driving signals Sa and Sb from $V_0$ [V] to $V_1$ [V].

Next, from the time t3 to the time t4, the control section 141 performs sweeping processing so as to thereby decrease the driving frequencies of the driving signals Sa and Sb to f1. At this time, when frequencies of the driving signals Sa and Sb reach a frequency range in which the driving can be performed, the vibration wave motor 12 starts the driving.

Furthermore, at the time t4, when the AF lens position is detected in the appropriate focus range, the control section 141 reads out the two phase differences (+90 degrees, −90 degrees) corresponding to the image capturing information and the detection information, periodically changes the phase difference information, and starts the control of the wobbling operation.

As shown in the drawing, from the time t4 to the time t5, the phase differences of the driving signals Sa and Sb are +90 degrees, and the vibration wave motor 12 is rotated forward. From the time t5 to the time t6, the phase differences of the driving signals Sa and Sb are changed from +90 degrees to −90 degrees, and the rotation direction of the vibration wave motor 12 is changed from the forward rotation to the backward rotation.

From the time t6 to the time t7, the phase differences of the driving signals are −90 degrees, and the vibration wave motor 12 is rotated backward. From the time t7 to the time t8, the phase differences of the driving signals Sa and Sb are changed from −90 degrees to +90 degrees, and the rotation direction of the vibration wave motor 12 is changed from the backward rotation to the forward rotation.

From the time t8 to the time t9, the phase differences of the driving signals Sa and Sb are +90 degrees, thereby performing forward rotation. Hereinafter, the control section 141 repeats the operations from the time t4 to the time t8 periodically at a cycle of for example, 30 Hz, controls the vibration wave motor 12 by changing the phase difference information, and executes the wobbling operation by which the AF lens position is shifted back and forth.

[2. Case where Subject is Moving at Constant Speed]

Figure 7:
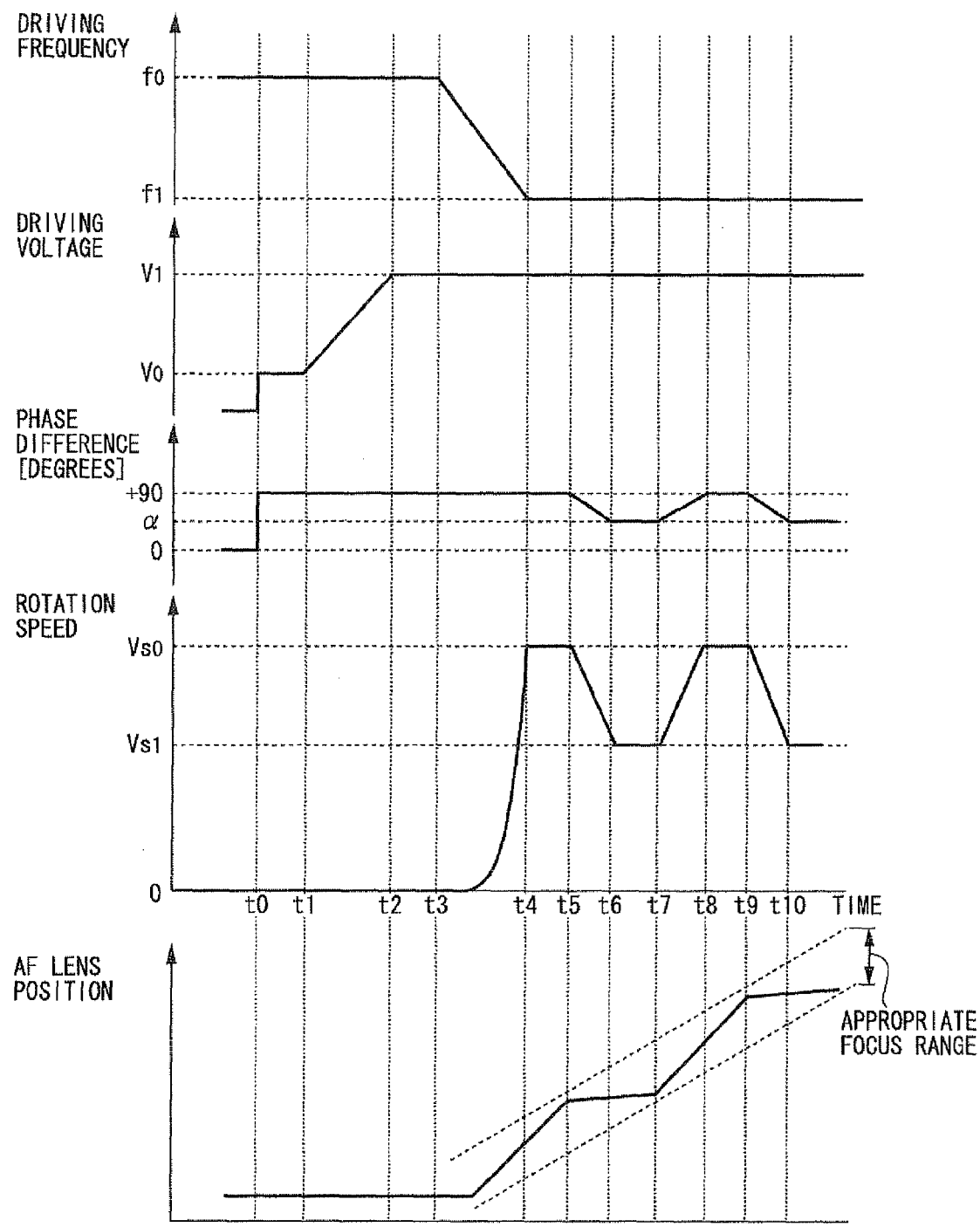
FIG. 7 is a diagram chronologically illustrating an example of a relationship among the frequencies, the voltages (amplitudes), and the phase differences of the driving signals Sa and Sb, the rotation speed of the vibration wave motor 12, and the AF lens position in a case where the subject is moving at a constant speed in the same embodiment.

FIG. 7 is a diagram chronologically illustrating an example of a relationship among the frequencies, the voltages (amplitudes), and the phase differences of the driving signals Sa and Sb, the rotation speed of the vibration wave motor 12, and the AF lens position in a case where the subject is moving at a constant speed in the same embodiment.

The operations from the time t0 to the time t3 are the same as the operations of the above-mentioned case where a subject remains stationary, and thus the description thereof will be omitted.

At the time t4, when the AF lens position is detected in the appropriate focus range, the control section 141 reads out the two phase differences (+90 degrees, α degrees) corresponding to the image capturing information and the detection information, periodically changes the phase difference information, and starts the control of the wobbling operation.

As shown in the drawing, from the time t4 to the time t5, the phase differences of the driving signals Sa and Sb are +90 degrees, and the vibration wave motor 12 is driven in the forward rotation direction at the rotation speed $V_{S0}$. From the time t5 to the time t6, the phase differences of the driving signals Sa and Sb are changed from +90 degrees to α degrees, and the rotation speed of the vibration wave motor 12 is reduced. Here, the rotation direction of the vibration wave motor 12 is still the forward rotation direction.

From the time t6 to the time t7, the phase differences of the driving signals are α degrees, and the vibration wave motor 12 is driven in the forward rotation direction at the rotation speed $V_{S1}$ slower than $V_{S0}$. From the time t7 to the time t8, the phase differences of the driving signals Sa and Sb are changed from α degrees to +90 degrees, and the rotation speed of the vibration wave motor 12 increases, and is changed to $V_{S0}$ again. From the time t8 to the time t9, the phase differences of the driving signals Sa and Sb are +90 degrees, and the vibration wave motor 12 is driven in the forward rotation direction at the rotation speed $V_{S0}$.

Thereafter, the control section 141 controls the vibration wave motor 12 while forming an image of the subject by periodically repeating the operations from the time t4 to the time t8 and periodically changing the phase difference information between +90 degrees and α degrees, and executes the wobbling operation by changing the rotation speed of the vibration wave motor 12 in a repetition manner of $V_{S0} \rightarrow V_{S1} \rightarrow V_{S0} \rightarrow$.

The control section 141 periodically changes the phase differences of the driving signals Sa and Sb through the two phase differences based on the image capturing information and the detection information, and is thereby able to execute the wobbling operation through the processing the same as the processing in the case where the above-mentioned subject is being moved at a constant speed. Since it is possible to execute the wobbling operation without the necessity of switching the processing on the basis of the image capturing information, the throughput of the control section 141 does not increase, and this is appropriate for an electronic camera.

In addition, even in the case where the rotation direction of the vibration wave motor 12 is the backward direction, the wobbling operation can be executed through the same processing. At this time, the two phase differences, which are read out from the conversion table 141a by the control section 141, are equal to, for example, −90 degrees and −α degrees. Then, the phase differences of the driving signals Sa and Sb from the time t4 to the time t5 are −90 degrees, and the vibration wave motor 12 is driven in the backward direction at the rotation speed $V_{S0}$. From the time t5 to the time t6, the phase differences of the driving signals Sa and Sb are changed from −90 degrees to −α degrees, and the rotation speed of the vibration wave motor 12 is reduced. Here, the rotation direction of the vibration wave motor 12 is still the backward direction.

From the time t6 to the time t7, the phase differences of the driving signals are −α degrees, and the vibration wave motor 12 is driven in the backward direction at the rotation speed $V_{S1}$ slower than $V_{S0}$. From the time t7 to the time t8, the phase differences of the driving signals Sa and Sb are changed from −α degrees to −90 degrees, and the rotation speed of the vibration wave motor 12 increases, and is changed to $V_{S0}$ again. From the time t8 to the time t9, the phase differences of the driving signals Sa and Sb are −90 degrees, and the vibration wave motor 12 is driven in the backward direction at the rotation speed $V_{S0}$.

Thereafter, the control section 141 periodically repeats the operation from the time t4 to the time t8, periodically changes the phase difference information between −90 degrees and −α degrees, and executes the wobbling operation.

[3. Case where Subject Remaining Stationary Starts Moving at Constant Acceleration Rate]

Figure 8:
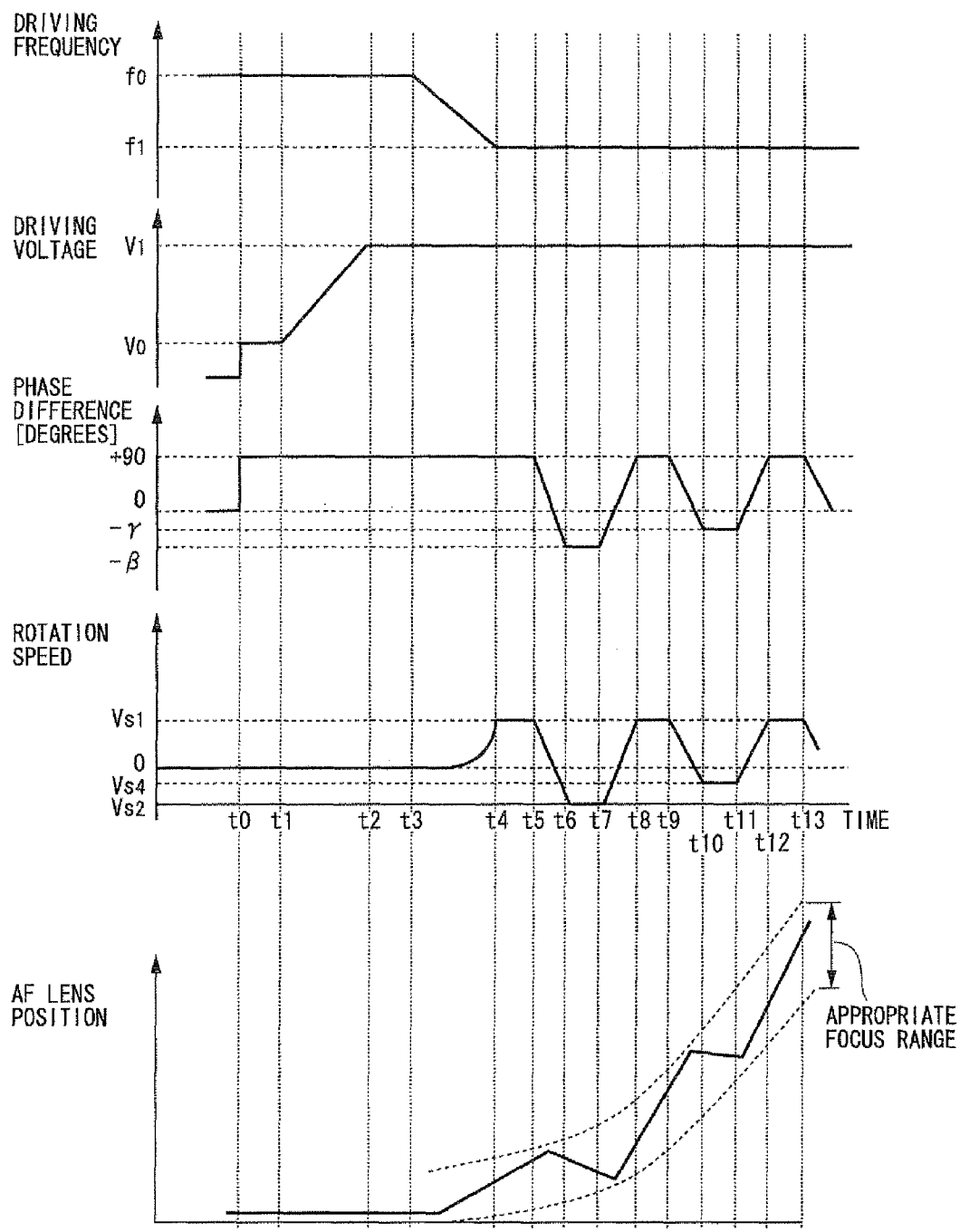
FIG. 8 is a diagram chronologically illustrating an example of a relationship among the frequencies, the voltages (amplitudes), and the phase differences of the driving signals Sa and Sb, the rotation speed of the vibration wave motor 12, and the AF lens position in a case where a subject remaining stationary starts moving at a constant acceleration rate in the same embodiment.

FIG. 8 is a diagram chronologically illustrating an example of a relationship among the frequencies, the voltages (amplitudes), and the phase differences of the driving signals Sa and Sb, the rotation speed of the vibration wave motor 12, and the AF lens position in a case where a subject remaining stationary starts moving at a constant acceleration rate in the same embodiment.

The operations from the time t0 to the time t3 are the same as the operations of the above-mentioned case where a subject remains stationary, and thus the description thereof will be omitted.

At the time t4, when the AF lens position is detected in the appropriate focus range, the control section 141 reads out the two phase differences (+90 degrees, −β degrees) corresponding to the image capturing information and the detection information, periodically changes the phase difference information, and starts the control of the wobbling operation.

As shown in the drawing, from the time t4 to the time t5, the phase differences of the driving signals Sa and Sb are +90 degrees, and the vibration wave motor 12 is driven in the forward rotation direction at the rotation speed $V_{S1}$. From the time t5 to the time t6, the phase differences of the driving signals Sa and Sb are changed from +90 degrees to −β degrees, and the rotation speed of the vibration wave motor 12 is reduced, and the motor is rotated backward.

From the time t6 to the time t7, the phase differences of the driving signals Sa and Sb are −β degrees, and the vibration wave motor 12 is driven in the backward rotation direction at the rotation speed $V_{S2}$. From the time t7 to the time t8, the phase differences of the driving signals Sa and Sb are changed from −β degrees to +90 degrees, and the rotation speed of the vibration wave motor 12 increases, and the motor is rotated forward.

At the time t8, the control section 141 reads out the two phase differences (+90 degrees, −γ degrees) corresponding to the image capturing information and the detection information. From the time t8 to the time t9, the phase differences of the driving signals Sa and Sb are +90 degrees, and the vibration wave motor 12 is driven in the forward rotation direction at the rotation speed $V_{S1}$. From the time t9 to the time 10, the phase differences of the driving signals Sa and Sb are changed from +90 degrees to −γ degrees, and the rotation speed of the vibration wave motor 12 is reduced, and is rotated backward.

From the time t10 to the time t11, the phase differences of the driving signals Sa and Sb are −γ degrees, and the vibration wave motor 12 is driven in the backward rotation direction at the rotation speed $V_{S4}$ slower than $V_{S2}$. From the time t11 to the time t12, the phase differences of the driving signals Sa and Sb are changed from −γ degrees to +90 degrees, and the rotation speed of the vibration wave motor 12 increases, and the motor is rotated forward. From the time t12 to the time t13, the phase differences of the driving signals Sa and Sb are +90 degrees, and the vibration wave motor 12 is driven in the forward rotation direction at the rotation speed $V_{S1}$.

Thereafter, it is possible to perform the wobbling operation by repeatedly performing the operations from the time t4 to the time t8 depending on the two phase differences corresponding to the image capturing information and the detection information which the control section 141 reads out.

Figure 9:
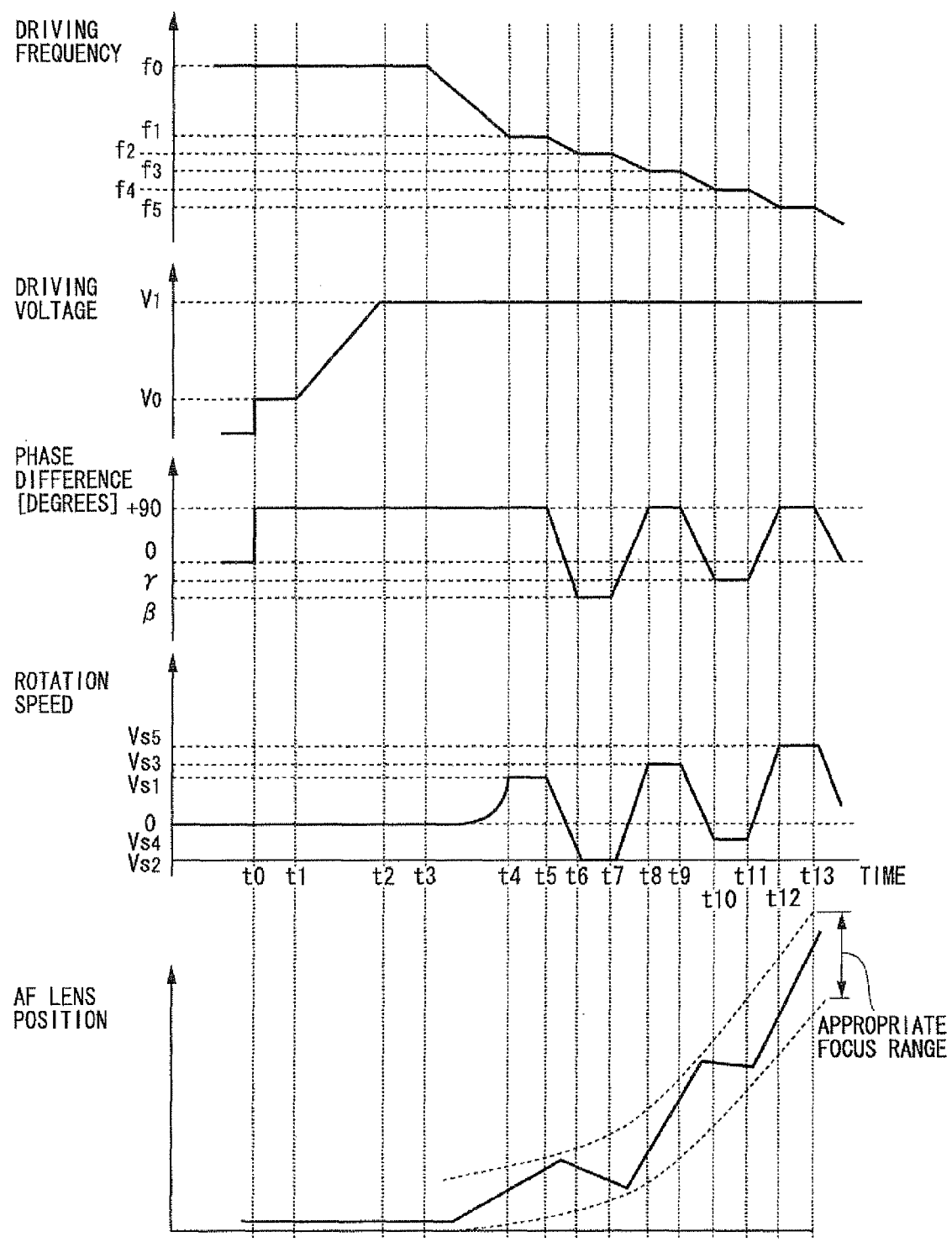
FIG. 9 is a diagram chronologically illustrating an example of a relationship among the frequencies, the voltages (amplitudes), and the phase differences of the driving signals Sa and Sb, the rotation speed of the vibration wave motor 12, and the AF lens position in a case where the subject remaining stationary starts moving at a constant acceleration rate in the same embodiment.

In the case where the subject is moving at the constant acceleration rate, the center value of the movement speed of the subject increases with passage of time. Therefore, when a desired rotation speed cannot be obtained at the phase differences of the driving signals Sa and Sb, by additionally changing the driving frequency, the vibration wave motor 12 is rotated at the desired rotation speed. FIG. 9 is a diagram chronologically illustrating an example of a relationship among the frequencies, the voltages (amplitudes), and the phase differences of the driving signals Sa and Sb, the rotation speed of the vibration wave motor 12, and the AF lens position in a case where the subject remaining stationary starts moving at a constant acceleration rate in the same embodiment.

In this case, by not only changing the phase differences of the driving signals Sa and Sb but also changing the frequencies of the driving signals Sa and Sb in conjunction with change of the phase differences, it is possible to obtain the desired rotation speed, and thus it is possible to perform the wobbling operation even on the subject which is moving at the constant acceleration rate. Furthermore, the driving frequencies of the driving signals Sa and Sb may be stored in advance in the conversion table 141*a*, similarly to the two phase differences. Thereby, in the above-mentioned three cases, the control section 141 is able to execute the wobbling operation through the same processing.

As described above, when driving the vibration wave motor 12 during photographing of a moving image, the electronic camera 1 of the embodiment, first, changes the amplitudes of the driving signals Sa and Sb applied to the vibration wave motor 12 from 0 [V] to a predetermined amplitude $V_0$ [V]. Thereafter, the electronic camera 1 executes processing of gradually increasing the amplitudes of the driving signals Sa and Sb and changing it from $V_0$ [V] to $V_1$ [V] for a period of time longer than that of the processing of changing the amplitude from 0 [V] to $V_0$ [V]. The noise, which is made when the driving signals Sa and Sb with the amplitude $V_0$ [V] are applied to the vibration wave motor 12, is hardly detected by the built-in microphone 70, and thus it is possible to reduce the noise which is made when the vibration wave motor 12 is driven. Furthermore, since the amplitudes of the driving signals Sa and Sb are gradually increased with spending time when the amplitudes are changed from $V_0$ [V] to $V_1$ [V], it is possible to suppress the noise which is made from the vibration wave motor 12, and thus it is possible to perform quiet driving.

The electronic camera 1 of the embodiment is configured to execute the wobbling operation by periodically changing the phase differences of the driving signals Sa and Sb applied to the vibration wave motor 12. Thereby, as compared with the conventional method of switching the forward rotation and the backward direction of the vibration wave motor by temporarily stopping the vibration wave motor and changing the phase differences of the pair of the driving signals to be applied, the forward rotation and the backward direction of the vibration wave motor 12 are switched by simple control. Furthermore, noise is made when the driving signals Sa and Sb are applied to the vibration wave motor 12. However, in the electronic camera 1 of the embodiment, by making the amplitudes of the driving signals Sa and Sb (voltage) constant at the time of performing the wobbling operation, the operation, which is a cause of the occurrence of noise, is not performed, and thus it is possible to perform quiet driving.

Second Embodiment

Figure 10:
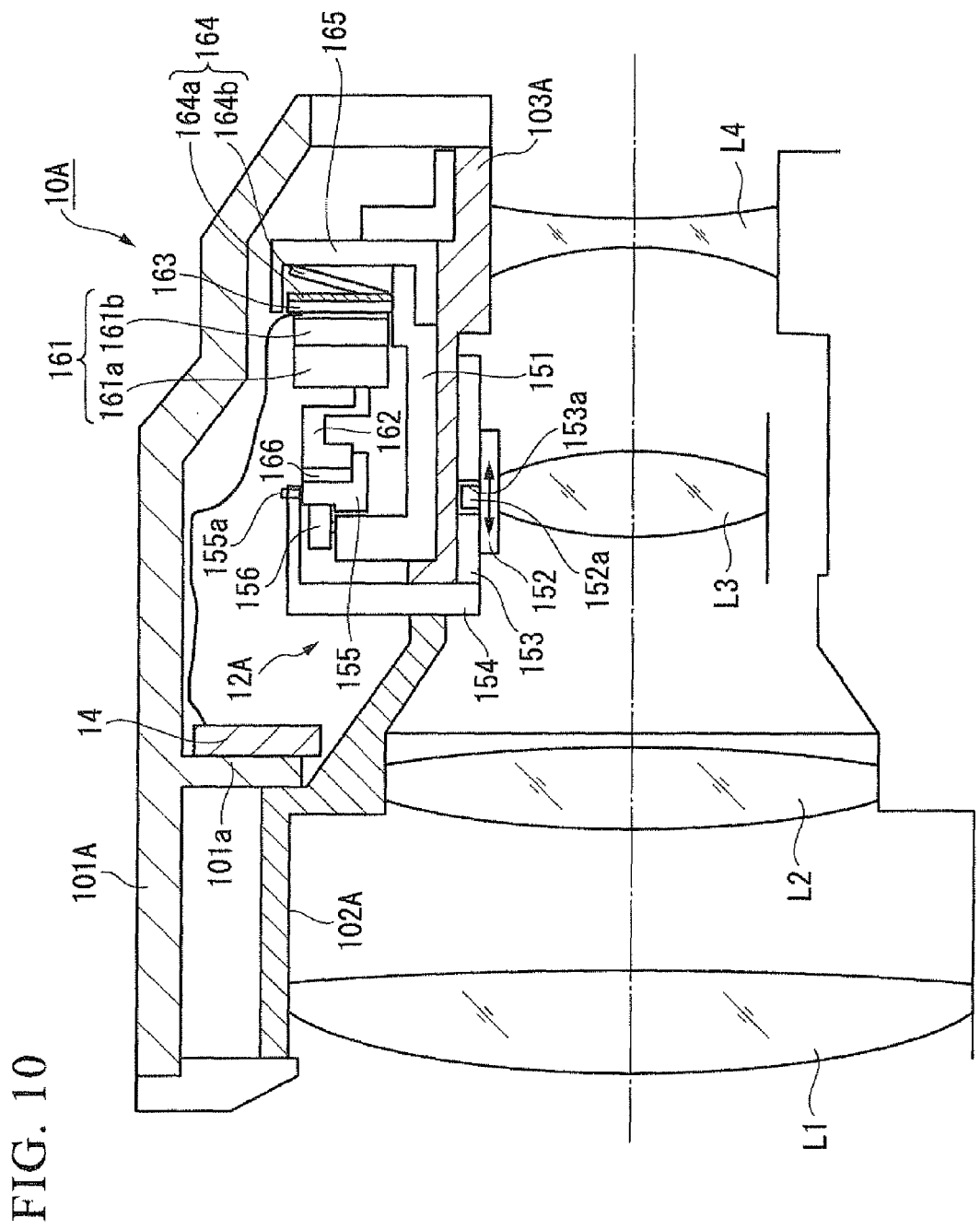
FIG. 10 is a schematic diagram illustrating a configuration of a lens barrel 10A in a second embodiment.

FIG. 10 is a schematic diagram illustrating a configuration of a lens barrel 10A in a second embodiment. The lens barrel 10A includes an external-side fixed barrel 101A that covers the outer circumferential portion of the lens barrel 10A; a first inner-side fixed barrel 102A that is positioned to the subject side on the inside than the external-side fixed barrel 101A; and a second inner-side fixed barrel 103A that is positioned closer to an image side on the inside than the external-side fixed barrel 101A.

Furthermore, the lens barrel 10A includes a vibration wave motor 12A which is disposed between the external-side fixed barrel 101A and the second inner-side fixed barrel 103A, and is fixed onto the second inner-side fixed barrel 103A by a fixing member 151.

Furthermore, in order from the subject side, the first lens group L1 and the second lens group L2 are fixed onto the first inner-side fixed barrel 102A, and the fourth lens group L4 is fixed onto the second inner-side fixed barrel 103A. Between the second lens group L2 and the fourth lens group L4, the third lens group L3, which is a focusing AF lens supported by an AF ring 152, is disposed. That is, the first lens group L1, the second lens group L2, the third lens group L3, and the fourth lens group L4 are sequentially arranged in order from the subject side toward the side of the image capturing device in the optical axis direction.

Between the AF ring 152 and the second inner-side fixed barrel 103A, a cam ring 153 is provided to be rotatable about the optical axis as a center axis. The cam ring 153 is rotated by the power of the vibration wave motor 12A which is transferred via the fork 154. Furthermore, inside the cam ring 153, a key groove 153*a* is cut in a spiral shape in the circumferential direction. Furthermore, a fixing pin 152*a* is provided on the outer circumferential side of the AF ring 152, and the fixing pin 152*a* is inserted into the key groove 153*a* of the cam ring 153.

Furthermore, the vibration wave motor driving device 14 is disposed on a holding portion 101*a* which extends from the inner circumferential side of the external-side fixed barrel 101A to the inside. The vibration wave motor driving device 14 is electrically connected to the vibration wave motor 12A so as to thereby drive the vibration wave motor 12A.

The vibration wave motor 12A includes: a stator 161 that has an elastic body 161*a* and a piezoelectric element 161*b* for converting electrical energy into mechanical energy; a movable member 162 that extracts the power thereof in pressurized contact with the stator 161; a buffering/supporting member 163 that is formed of an unwoven fabric which is disposed on the non-driving face (face opposite to the face which comes into contact with the movable member 162) side of the stator 161; a pressurizing contact device 164 that is formed of a pressurizing plate 164*a* and a pressurizing member 164*b* and brings the stator 161 into pressurized contact with the movable member 162; and a power transfer member 155 and a press ring 165 that support such members from its left and right sides. The press ring 165 is fixed onto the fixing member 151 by a screw or the like.

The fork 154 is fitted with a protrusion portion 155*a* provided in the power transfer member 155, and transfers the rotation motion of the power transfer member 155 to the cam ring 153. The motions of the power transfer member 155 in the optical axis direction and the diameter direction is regulated by a bearing 156 mounted on the fixing member 151.

In the movable member 162, a vibration absorption member 166, such as a rubber for absorbing the vibration of the movable member 162 in the optical axis direction, is disposed. The vibration absorption member 166 is brought into pressurized contact with the power transfer member 155 by the pressurizing contact device 164.

In the embodiment, the configuration was made so as to include the vibration wave motor 12A having an annular shape, but it is possible to control the rotation speed and the rotation direction on the basis of the frequencies, amplitudes, and phase differences of the driving signals Sa and Sb. In addition, since the vibration wave motor driving device 14 is able to perform control similar to the control performed on the vibration wave motor 12 of the first embodiment, similarly to the first embodiment, it is possible to perform the wobbling operation.

Furthermore, by providing the vibration wave motor 12A having an annular shape, although the gear or the like is not used, it is possible to transfer the power of the vibration wave motor 12A to the cam ring 153. Therefore, it is possible to execute a smooth wobbling operation without causing looseness such as gear backlash.

Third Embodiment

Figure 11:
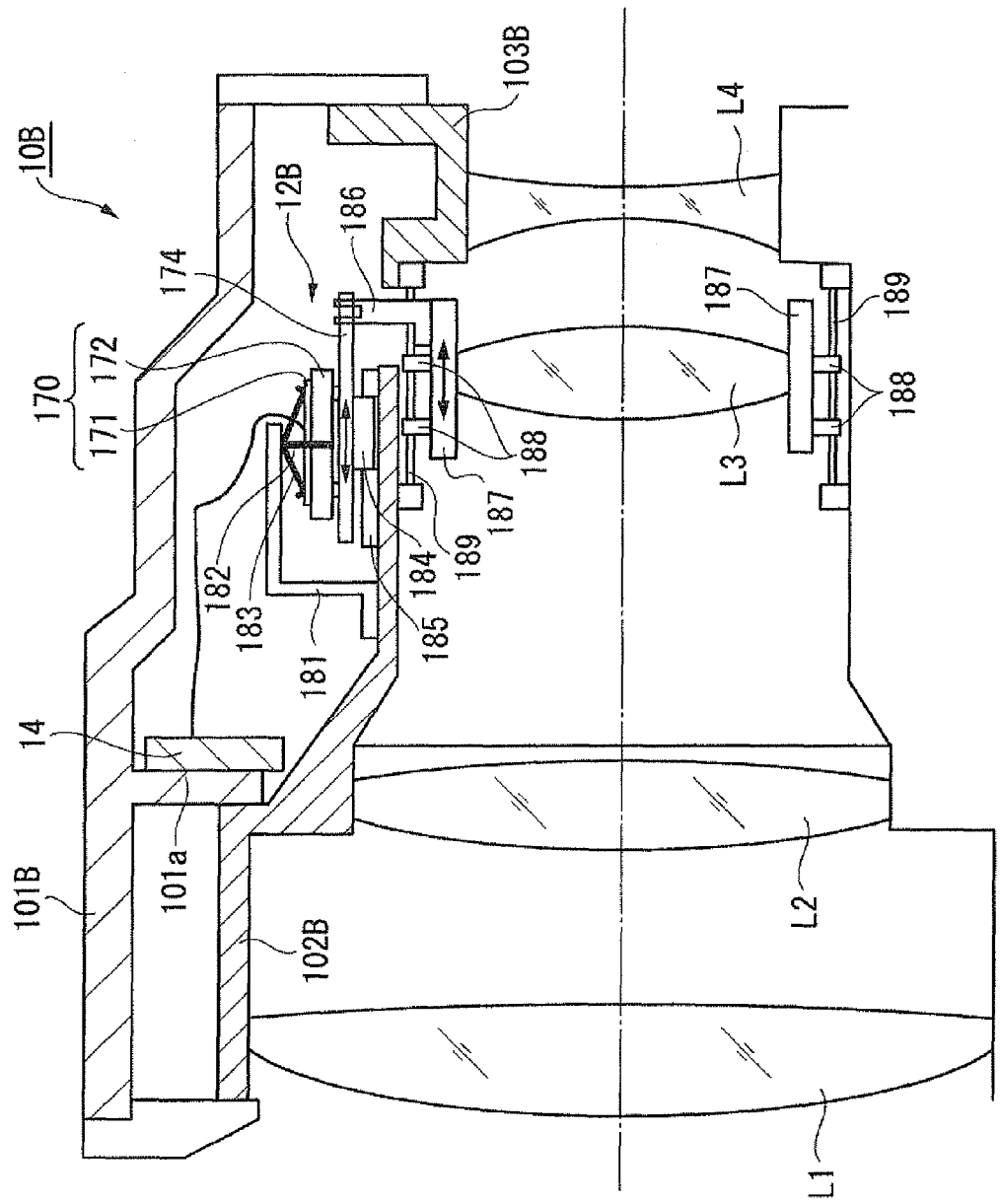
FIG. 11 is a schematic diagram illustrating a configuration of a lens barrel 10B in a third embodiment.

FIG. 11 is a schematic diagram illustrating a configuration of a lens barrel 10B in a third embodiment. The lens barrel 10B includes an external-side fixed barrel 101B that covers the outer circumferential portion of the lens barrel 10B; a first inner-side fixed barrel 102B that is positioned to the subject side on the inside than the external-side fixed barrel 101B; and a second inner-side fixed barrel 103B that is positioned closer an image side on the inside than the external-side fixed barrel 101B.

Furthermore, the lens barrel 10B includes: a vibration wave motor 12B which is disposed between the external-side fixed barrel 101B and the first inner-side fixed barrel 103B, and is fixed onto the second inner-side fixed barrel 103B by a fixing member 181; and a vibration wave motor driving device 14 that is disposed on the holding portion 101a which extends from the inner circumferential side of the external-side fixed barrel 101B to the inside. The vibration wave motor driving device 14 is electrically connected to the vibration wave motor 12B so as to thereby drive the vibration wave motor 12B.

Furthermore, in order from the subject side, the first lens group L1 and the second lens group L2 are fixed onto the first inner-side fixed barrel 102B, and the fourth lens group L4 is fixed onto the second inner-side fixed barrel 103B. Between the second lens group L2 and the fourth lens group L4, the third lens group L3, which is a focusing AF lens supported by an AF ring 187, is disposed. That is, the first lens group L1, the second lens group L2, the third lens group L3, and the fourth lens group L4 are sequentially arranged in order from the subject side toward the side of the image capturing device in the optical axis direction.

Figure 12:
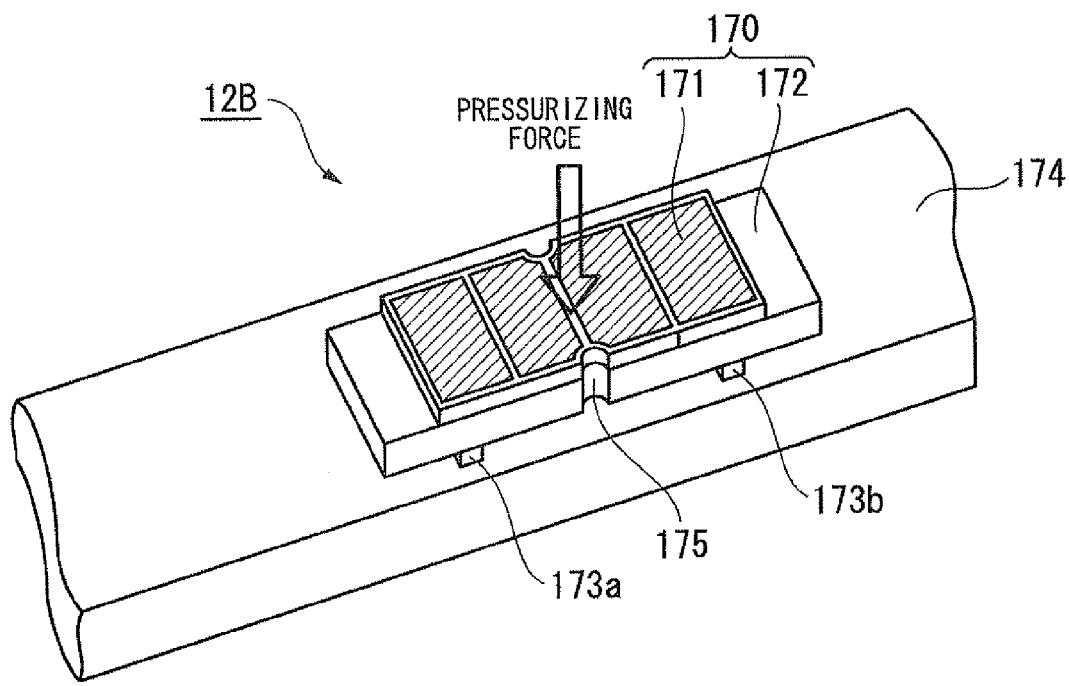
FIG. 12 is a diagram illustrating a configuration of a vibration wave motor 12B in the same embodiment.

FIG. 12 is a diagram illustrating a configuration of a vibration wave motor 12B in the same embodiment. As shown in the drawing, the vibration wave motor 12B includes a vibrator 170 that is formed of a piezoelectric element 171 and a metallic elastic body 172 which comes into contact with the piezoelectric element 171; protrusion portions 173a and 173b that is provided on the surface of the elastic body 172 opposite to the surface which comes into contact with the piezoelectric element 171 in order to acquire the power; and a movable member 174.

Figure 13:
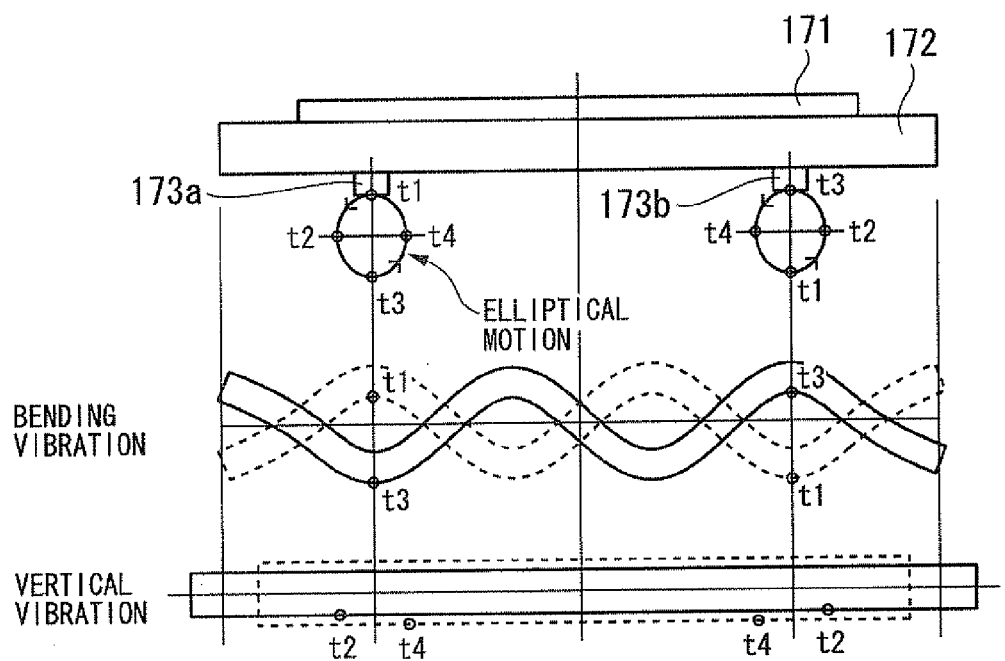
FIG. 13 is a diagram illustrating an operation of the vibration wave motor 12B in the same embodiment.

FIG. 13 is a diagram illustrating an operation of the vibration wave motor 12B in the same embodiment. When the pair of the driving signals Sa and Sb is applied to the piezoelectric element 171 and the phase differences of the driving signals Sa and Sb are set to 90 degrees, as shown in FIG. 13, in the protrusion portions 173a and 173b, by synthesizing the excited vertical vibration and bending vibration, elliptical motion occurs. Since the protrusion portions 173a and 173b come into pressurized contact with the movable member 174, a driving force is generated by friction. The protrusion portions 173a and 173b employs an abrasion resistant material, and are thus resistant to frictional wear.

Returning to FIG. 11, the vibrator 170 is supported by fitting a supporting pin 182, which is provided in the fixing member 181, into a cutout portion (recess portion) 175 of the vibrator 170. The pressurizing member 183 is disposed between the fixing member 181 and the vibrator 170, and brings the vibrator 170 into pressurized contact with the movable member 174.

The movable member 174 is made of a lightweight metal such as aluminum, and comes into pressurized contact with the protrusion portions 173a and 173b. Furthermore, the movable member 174 is fixed onto a linear guide 184 which is movable along the linear rail 185 and the optical axis direction. The linear rail 185 is fixed along the optical axis direction on the outer circumferential side of the first inner-side fixed barrel 102B. Thereby, the movable member 174 is linearly movable in the optical axis direction.

The fork 186 is mounted on the movable member 174, and thus the linear motion of the movable member 174 is transferred to the AF ring 187 via the fork 186. The AF ring 187 is provided with a guiding portion 188. The guiding portion 188 is configured to be movable along a straight line rail 189 which is provided along the optical axis direction on the inner circumferential side of the first inner-side fixed barrel 102B.

Thereby, the linear motion of the movable member 174 in the optical axis direction is transferred to the AF ring 187, whereby it is possible to move the AF ring 187 in the optical axis direction.

In the present embodiment, the lens barrel 10B is configured to include the linear-type vibration wave motor 12B, but it is possible to control the movement speed and the movement direction of the vibration wave motor 12B on the basis of the frequencies, amplitudes, and phase differences of the driving signals Sa and Sb. In addition, since the vibration wave motor driving device 14 is able to perform control similar to the control performed on the vibration wave motor 12 of the first embodiment, similarly to the first embodiment, it is possible to perform the wobbling operation.

Furthermore, in the present embodiment, similarly to the second embodiment, although the gear or the like is not used, it is possible to transfer the power of the vibration wave motor 12B to the AF ring 187. Therefore, it is possible to execute a smooth wobbling operation without causing looseness such as gear backlash.

Furthermore, since there is no loss caused by friction and the like occurring when the rotation motion used in the first and second embodiments is converted into the linear motion, it is possible to improve use efficiency in energy. Furthermore, since the sliding surface of the AF ring 187 is removed, it is possible to reduce noise which is made by sliding, and thus it is possible to perform quiet driving.

In addition, the above-mentioned first to third embodiments describe the operation which performs the sweeping processing after the voltages of the driving signals Sa and Sb reach $V_1$. However, the invention is not limited to this, and the sweeping processing may be controlled to be started before the voltages of the driving signals Sa and Sb reach $V_1$. Thereby, it is possible to shorten time that elapses until the vibration wave motor starts the driving, and thus it is possible to improve responsiveness of the autofocus function.

In addition, the above-mentioned first to third embodiments describe the configuration in which the two phase differences corresponding to the photography information and the detection information are stored in the conversion table 141a. However, the invention is not limited to this, and the frequencies of the driving signals Sa and Sb may be stored together with the two phase differences in the conversion table 141a so as to be associated with the photography information and detection information. Thereby, it is possible to change the rotation speed of the vibration wave motor 12, and thus it is possible to improve the autofocus function during photographing of a moving image by determining the speed of the wobbling operation in accordance with the movement speed of the subject.

Furthermore, the above-mentioned first to third embodiments describe the operation in which the control section 141 performs control to set the phase differences of the driving signals Sa and Sb, which is output by the phase shifting section 143, to +90 degrees when the driving command signal is input. However, the invention is not limited to this, and the phase differences may be set to a predetermined arbitrary phase difference.

Furthermore, the above-mentioned first to third embodiments describe a configuration in which the wobbling operation is performed by changing the phase differences of the driving signals Sa and Sb. However, the invention is not limited to this, and the wobbling operation may be performed by changing the amplitudes of the driving signals Sa and Sb (voltage) in addition to the phase differences.

Furthermore, in the electronic camera 1, when a still image is captured, the wobbling operation is not necessary for the control section 141. Therefore, by using a heretofore known technique, the vibration wave motor 12 is controlled on the basis of the frequencies of the driving signals Sa and Sb.

Furthermore, in the above-mentioned first to third embodiments, when the vibration wave motor 12 is stopped, the procedure of the processing for driving the above-mentioned vibration wave motor 12 may be reversed. Specifically, the control section 141 stops the periodic change of the phase difference information, outputs the frequency information, which represents the driving frequency f0, to the vibration generating section 142, and sets the frequencies of the driving signals Sa and Sb outside the frequency range capable of driving the vibration wave motor 12, thereby stopping driving the vibration wave motor 12. Thereafter, the control section 141 stops the amplifying section 144 from applying the driving signals Sa and Sb to the vibration wave motor 12 by reducing the amplitudes of the driving signals Sa and Sb to $V_0$ [V]. Thereby, in the same manner as the case of driving the vibration wave motor 12, by reducing noise which is made when the vibration wave motor 12 is stopped, it is possible to prevent the noise from being detected by the built-in microphone 70.

Furthermore, in the above-mentioned first to third embodiments, the control section 141 is provided with the conversion table 141a for each interchangeable lens (lens barrel 10), whereby a plurality of conversion tables may be provided. For each interchangeable lens, lens characteristics, a focal length, and the like are different. Therefore, by determining the wobbling operation itself in accordance with the interchangeable lens, it is possible to perform the wobbling operation most appropriate for the interchangeable lens, and it is possible to improve the autofocus function during photographing of a moving image.

The above-mentioned control section 141 may have a computer system provided therein. In this case, the step of the processing of executing the above-mentioned wobbling operation is stored in a computer-readable recording medium in a program format and a computer reads and executes the program, thereby the processing is performed. Here, the computer-readable recording medium is defined to include a magnetic disk, a magneto-optical disc, a CD-ROM, a DVD-ROM, a semiconductor memory, and the like. Furthermore, by transferring the computer program to the computer to a communication line, the computer, to which the program is transferred, may execute the corresponding program.

Fourth Embodiment

Figure 14:
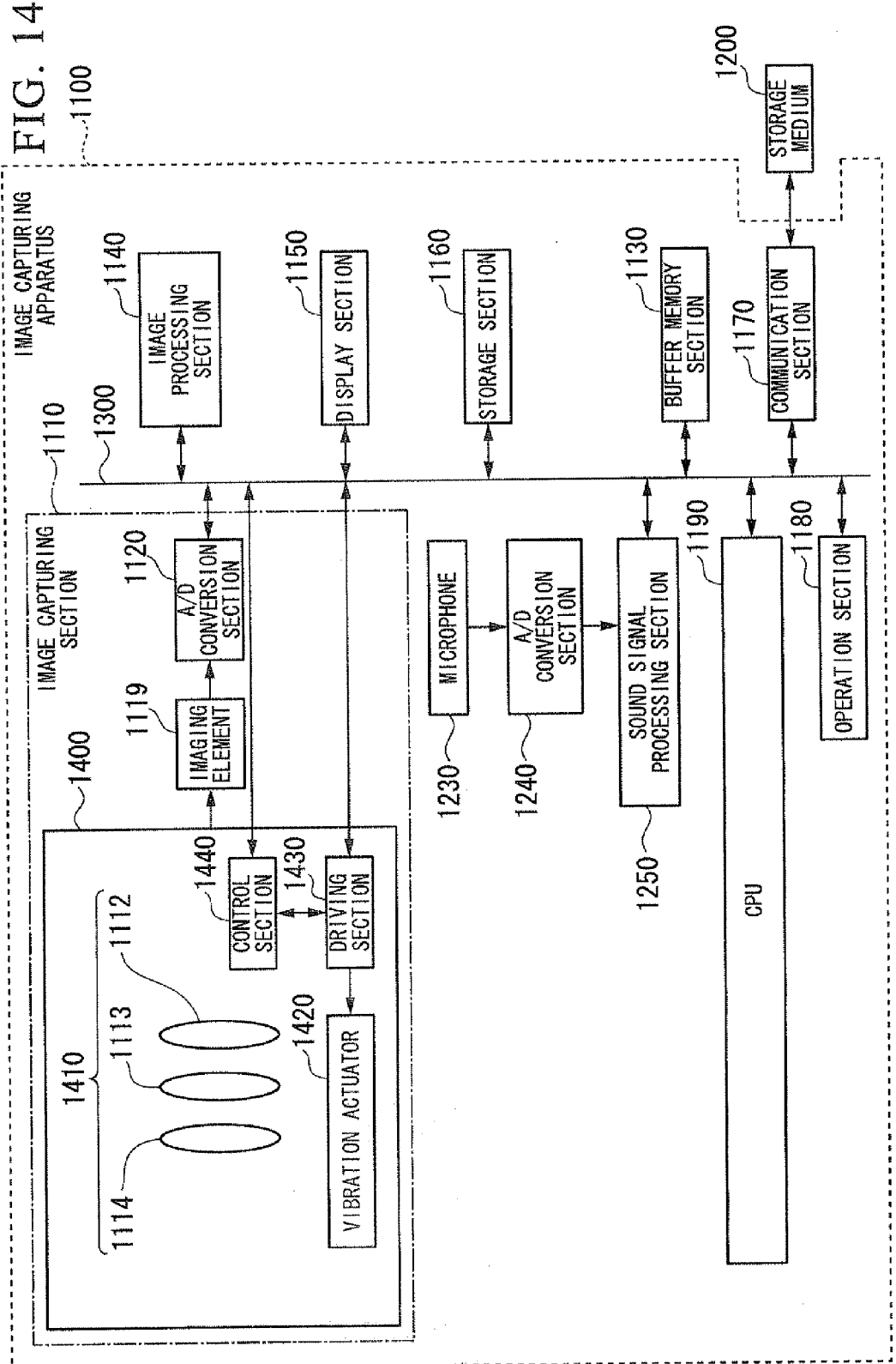
FIG. 14 is a block diagram illustrating a configuration of an image capturing apparatus having a control device according to a fourth embodiment.

Hereinafter, referring to the drawings, the embodiments of the present invention will be described. FIG. 14 is a schematic block diagram illustrating configurations of an image capturing apparatus 1100, which has a sound recording device, and a lens barrel 1400, which is mounted on the image capturing apparatus 1100, according to a fourth embodiment of the invention.

The lens barrel 1400 is mounted on the image capturing apparatus 1100 according to the present embodiment so as to be interchangeable. For example, the image capturing apparatus 1100 includes a mounting section in which the lens barrel 1400 is mounted. Furthermore, the mounting section has an electric connection portion through which the image capturing apparatus 1100 is electrically connected to the lens barrel 1400. Through the electric connection portion, electric information and signals are transmitted and received between the image capturing apparatus 1100 and the lens barrel 1400.

Next, the configuration of the lens barrel 1400 will be described. As an example, the lens barrel 1400 includes: a plurality of lenses (optical system) 1410; a vibration actuator 1420; and a driving section 1430. The plurality of lenses 1410 includes: for example, a zoom lens 1114; a focus adjustment lens (hereinafter referred to as an AF (Auto Focus) lens) 1112; and an image-stabilizer lens (hereinafter referred to as a VR (Vibration Reduction) lens) 1113.

The lens barrel 1400 guides an optical image passing through the zoom lens 1114, the VR lens 1113, and the AF lens 1112 onto the light receiving surface of the image capturing device 1119, which is provided in the image capturing apparatus 1100, to be described later.

The vibration actuator 1420 has a piezoelectric element. The piezoelectric element of the vibration actuator 1420 is driven by the driving section 1430, and the vibration actuator 1420 shifts the position of the zoom lens 1114, the VR lens 1113, the AF lens 1112, or the like in the optical axis direction.

Next, a configuration of the image capturing apparatus 1100 will be described. The image capturing apparatus 1100 includes: an image capturing section 1110; a CPU (Central Processing Unit) 1190; an operation section 1180; an image processing section 1140; a display section 1150; a storage section 1160; a buffer memory section 1130; a communication section 1170; a microphone 1230; an A/D (Analog/Digital) conversion section 1240; a sound signal processing section 1250; and a bus 1300.

The image capturing section 1110 includes an image capturing device 1119 and an A/D conversion section 1120, is controlled by the CPU 1190 in accordance with the set image capturing condition (for example, an aperture diaphragm value, an exposure value, and the like) so as to form an optical image on the image capturing device 1119 through an optical system provided in the lens barrel 1400, and generates image data based on the corresponding optical image which is converted into a digital signal by the A/D conversion section 1120. Here, the optical system provided in the lens barrel 1400 is a plurality of lenses such as a zoom lens 1114, a VR lens 1113, an AF lens 1112, and the like.

The image capturing device 1119 converts, for example, an optical image which is formed on the light receiving surface into an electric signal, and outputs the signal to the A/D conversion section 1120.

Furthermore, the image capturing device 1119 stores the image data, which is obtained when an instruction to perform photographing is received through the operation section 1180, in a storage medium 1200 through the A/D conversion section 1120 or the image processing section 1140 as photographed image data of photographed still images.

On the other hand, for example, in a state where an instruction to capture an image is not received through the operation section 1180, the image capturing device 1119 outputs image data, which is consecutively obtained, as through-the-lens image data to the CPU 1190 and the display section 1150 through the A/D conversion section 1120 or the image processing section 1140.

The A/D conversion section 1120 analog/digital converts the electronic signal which is converted by the image capturing device 1119, and outputs the image data which is a converted digital signal.

The operation section 1180 includes, for example, a power switch, a shutter button, and other operation keys. The operation section is operated by a user, receives user's operation input, and outputs the input to the CPU 1190.

The image processing section 1140 performs an image processing to the image data, which is recorded in a buffer memory 1130 or a storage medium 1200, referring to the image processing condition which is stored in the storage section 1160.

The display section 1150 is, for example, a liquid crystal display, and displays an operation screen and the image data obtained by the image capturing section 1110.

The storage section 1160 stores the determination condition, the image capturing condition, and the like which are used as references when a scene is determined by the CPU 1190.

The microphone 1230 receives sound, and outputs a sound signal corresponding to the received sound. The sound signal is an analog signal. The A/D conversion section 1240 analog/digital converts the sound signal, which is the analog signal input from the microphone 1230, into a sound signal which is a digital signal. Through the microphone 1230 and the A/D conversion section 1240, the received sound is converted into the sound signal as a digital signal, that is, the sound wave is converted into an electrical signal.

The sound signal processing section 1250 executes a sound signal processing, such as a processing of changing a format of the sound data and a processing of compressing data, on the sound signal which is converted into a digital signal by the A/D conversion section 1240, and stores the sound signal subjected to the sound signal processing in the storage medium 1200.

In addition, when the sound signal, which is subjected to the sound signal processing by the sound signal processing section 1250, is stored in the storage medium 1200, the sound signal may be stored to be associated with image data, which is obtained by image capturing of the image capturing device 1119, in terms of time, and may be stored as a moving image which includes a sound signal.

The buffer memory section 1130 temporarily stores the image data, which is obtained by image capturing of the image capturing section 1110, the sound signal which is converted by the sound signal processing section 1250, or the like.

The communication section 1170 is connected to the storage medium 1200, records, reads, or deletes the information in or from the detachable storage medium 1200 such as a card memory.

The storage medium 1200 is detachably connected to the image capturing apparatus 1100, and stores, for example, image data, which is generated by the image capturing section 1110, and the sound signal which is subjected to the sound signal processing by the sound signal processing section 1250.

The CPU 1190 controls the entire image capturing apparatus, as an example, generates the driving control signal for driving the vibration actuator 1420 through the driving section 1430 on the basis of the operation input which is input from the operation section 1180, and outputs the generated driving control signal to the driving section 1430. In such a manner, the CPU 1190 controls the position of the zoom lens 1114, the VR lens 1113 or the AF lens 1112 through the driving section 1430 on the basis of the driving control signal.

The bus 1300 is connected to: the image capturing section 1110; the CPU 1190; the operation section 1180; the image processing section 1140; the display section 1150; the storage section 1160; the buffer memory section 1130; the communication section 1170; and the sound signal processing section 1250. The bus transmits the data, which is output from the respective sections, and the like. Furthermore, the bus 1300 is connected to the respective sections provided in the lens barrel 1400 via an electric contact portion of the mount portion.

In addition, the lens barrel 1400 may have a control section 1440 such as a CPU. In this case, for example, the control section 1440 may control the position of the VR lens 1113 through the driving section 1430 by outputting the driving control signal to the driving section 1430. Thereby, in the lens barrel 1400, it is possible to prevent hand shake from occurring. Furthermore, when the lens barrel 1400 has the control section 1440 such as the CPU, the driving control signal from the CPU 1190 may be input to the driving section 1430 through the control section 1440.

Here, the above-mentioned vibration actuator 1420 will be described. In the vibration actuator 1420, an electric signal with a certain specific frequency is input to an electromechanical conversion element such as a piezoelectric element, whereby the electromechanical conversion element vibrates. The electromechanical conversion element has a metal member which is excited by the vibration. In addition, the electromechanical conversion element and the metal member function as a vibrator, and the vibrator is in pressurized contact with a relative motion member. The relative motion member described herein is a target of which the position is displaced by the vibration actuator 1420, and is, for example, the zoom lens 1114, the AF lens 1112, or the VR lens 1113 of FIG. 14.

The vibration wave generated from the vibrator such as ultrasonic wave vibration is transferred to the relative motion member, which is in pressurized contact therewith, by frictional contact. Thereby, it is possible to frictionally drive the relative motion member. In addition, as the vibrator, metal members such as an iron-based member and a stainless-based member are used, and as the relative motion member, ceramics such as aluminum, alumite subjected to surface treatment, and alumina are used. The vibration actuator 1420 as an example is configured as follows.

The above-mentioned driving section 1430 may drive the vibration actuator 1420 having the piezoelectric element on the basis of the driving control signal, which is transmitted from the CPU 1190, or the driving control signal which is transmitted from the control section 1440. In this case, the vibration actuator 1420 is driven in the following manner.

When driving the piezoelectric element, the driving section 1430 drives the piezoelectric element by using a first time constant in a first time period, and drives the piezoelectric element by using a second time constant, of which a time constant value is smaller than that of the first time constant, in a second time period subsequent to the first time period. The first time period is, for example, a time period based on the time constant $\tau$ of the piezoelectric element. As an example of the first time period, there is a predetermined time period such as a time period in which the value of the time constant $\tau$ becomes twice.

As described above, in the first time period for driving the piezoelectric element, the driving section 1430 drives the piezoelectric element more slowly than the second time period subsequent thereto, and thereby performs soft start. That is, at the initial stage (at the time of starting the driving) for driving the piezoelectric element, the piezoelectric element is more slowly driven with preparing the subsequent stage, thereby performing the soft start. Thereby, at the initial stage (at the time of starting the driving) for driving the piezoelectric element of the vibration actuator 1420, it is possible to reduce unexpected application of current and a voltage to the piezoelectric element provided in the vibration actuator 1420. Hence, it is possible to reduce the sound which is made when the vibration actuator 1420 having the piezoelectric element is driven.

Therefore, for example, when the sound received through the microphone 1230 is stored, it is possible to reduce a possibility that the sound made from the vibration actuator 1420 is recorded.

Furthermore, some users using the image capturing apparatus 1100 may feel discomfort because of the sound which is made when the vibration actuator 1420 is driven. Even in this case, in the same manner as described above, it is possible to reduce the sound which is made when the vibration actuator 1420 is driven. Accordingly, it is possible to reduce a possibility that the sound, which is made when the vibration actuator 1420 is driven, make a user feel discomfort. Thereby, it is possible to offer a comfortable feeling to a user when the user uses the image capturing apparatus 1100.

In addition, in FIG. 14, the vibration actuator 1420 and the driving section 1430 corresponds to the driving devices that drive the zoom lens 1114, the AF lens 1112, or the VR lens 1113.

Next, referring to FIG. 15, a description will be given of an example of the components of the driving section 1430 and the equivalent circuits of the vibration actuator 1420 which was described with reference to FIG. 14.

Figure 15:
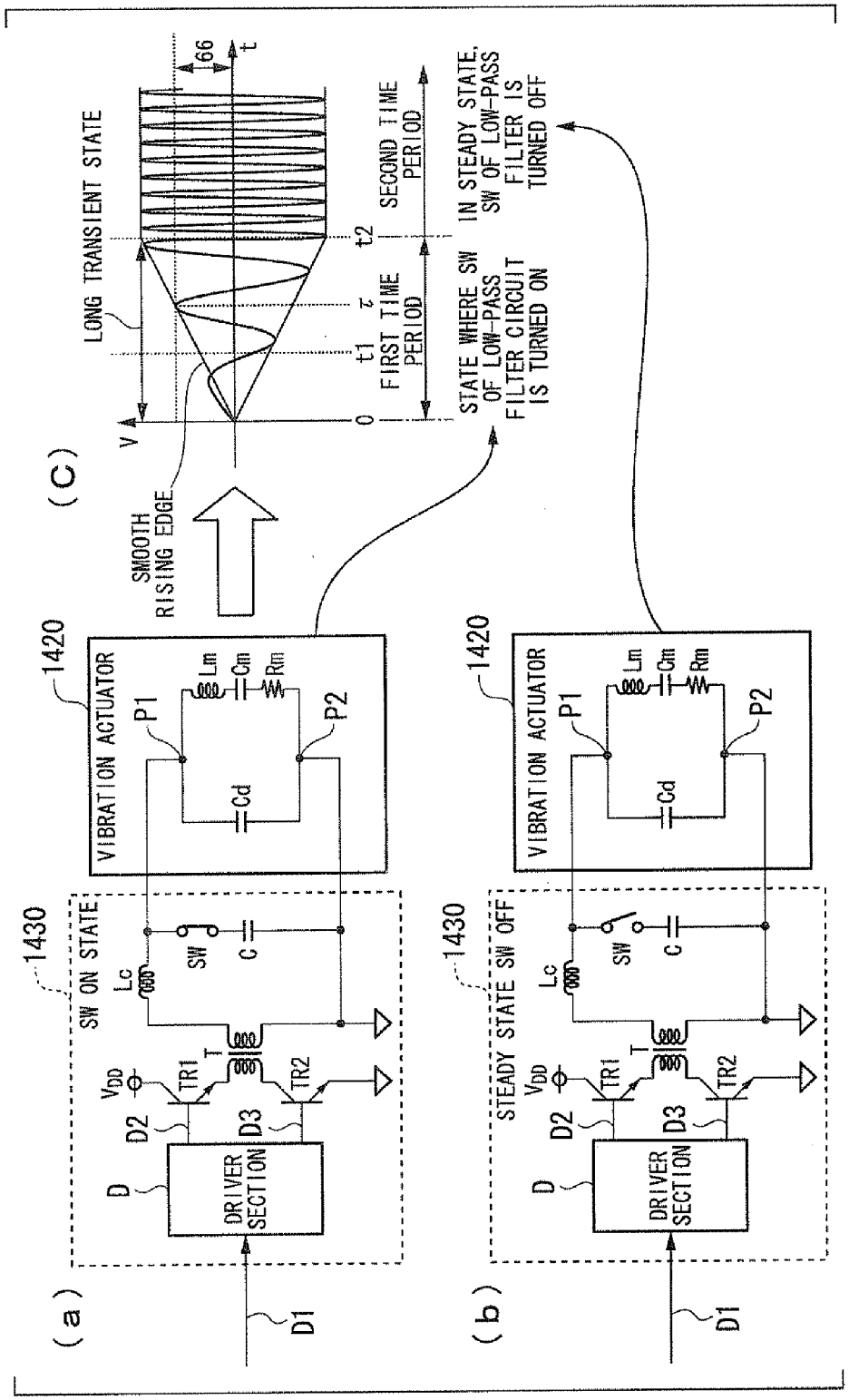
FIG. 15 is an explanatory diagram illustrating a configuration and an operation of the control device according to the same embodiment.

As shown in FIG. 15(*a*), the vibration actuator 1420 is configured to include an equivalent coil Lm, an equivalent capacitor Cm, and an equivalent resistance Rm which are connected in series as equivalent circuits in the vicinity of a resonance frequency, and a damping capacitor Cd which is connected in parallel to the series-connected components (the equivalent coil Lm, the equivalent capacitor Cm, and the equivalent resistance Rm). In addition, the damping capacitor Cd is a damping capacitance in the piezoelectric element provided in the vibration actuator 1420.

Furthermore, as shown in FIG. 15(*a*), the driving section 1430 is configured to include: a driver section D; a transistor TR1; a transistor TR2; a transformer T; a coil Lc; a switch SW; and a capacitor C. The transistors TR1 and TR2 are, for example, NPN bipolar transistors.

The first terminal D1 of the driver section D is connected to the CPU 1190, or the control section 1440 through the bus 1300, and receives an input of the control driving signal. The second terminal D2 of the driver section D is connected to the base terminal of the transistor TR1. Furthermore, the third terminal D3 of the driver section D is connected to the base terminal of the transistor TR2. The collector terminal of the transistor TR1 is connected to the power source VDD, and the emitter terminal of the transistor TR1 is connected to one terminal of the primary winding of the transformer T. The collector terminal of the transistor TR2 is connected to the other terminal of the primary winding of the transformer T, and the emitter terminal of the transistor TR2 is grounded.

One terminal of the secondary winding of the transformer T is connected to one terminal of the switch SW and one terminal of the vibration actuator 1420 through the coil Lc. Furthermore, the other terminal of the switch SW is connected to one terminal of the capacitor C. Furthermore, the other terminal of the secondary winding of the transformer T is grounded together with the other terminal of the capacitor C and the other terminal of the vibration actuator 1420.

In addition, one terminal and the other terminal of the vibration actuator 1420 are one connection point P1 and the other connection point P2 of two connection points between the series-connected equivalent coil Lm, equivalent capacitor Cm, and equivalent resistance Rm and the damping capacitor Cd which is connected in parallel to the series-connected components.

FIG. 15(*a*) is a configuration diagram of a state where the switch SW is turned on, and FIG. 15(*b*) is a configuration diagram of a state where the switch SW is turned off. As shown in FIGS. 15(*a*) and 15(*b*), in the state where the switch SW is turned on, the capacitor C is connected in parallel to the vibration actuator 1420. Accordingly, in this case, the value of the capacitance Ctotal of the circuit as a driving target of the driving section 1430 is represented by the following Expression 1.

$$C\text{total} = Cd + C: \qquad \text{(Expression 1)}$$

In addition, Cd is a value of the capacitance of the damping capacitor Cd, and C is a value of the capacitance of the capacitor C.

In contrast, in the state where the switch SW is turned off, the capacitor C is not connected in parallel to the vibration actuator 1420. Accordingly, in this case, the value of the capacitance Ctotal of the circuit as a driving target of the driving section 1430 is represented by the following Expression 2.

$$C\text{total} = Cd: \qquad \text{(Expression 2)}$$

In the case of FIG. 15, when the driving section 1430 drives the vibration actuator 1420, if the switch SW is turned on, on the basis of the time constant (corresponding to the first time constant) corresponding to the capacitance Ctotal represented by Expression 1, the driving section 1430 drives the vibration actuator 1420. In contrast, when the driving section 1430 drives the vibration actuator 1420, if the switch SW is turned off, on the basis of the time constant (corresponding to the second time constant) corresponding to the capacitance Ctotal represented by Expression 2, the driving section 1430 drives the vibration actuator 1420.

Next, referring to FIG. 15(*c*), a description will be given of an example of operations in the case where the driving section 1430 drives the vibration actuator 1420. Here, the description is based on the assumption that the driving section 1430 starts driving the vibration actuator 1420 from the time 0.

First, in the first time period from the time 0 to the time t2, the driving section 1430 drives the vibration actuator 1420 in the state where the switch SW is turned on. Next, in the second time period after the time t2, the driving section 1430 drives the vibration actuator 1420 in the state where the switch SW is turned off.

That is, in the first time period from the time 0 to the time t2, the driving section 1430 drives the vibration actuator 1420 on the basis of the time constant (corresponding to the first time constant) corresponding to the capacitance Ctotal represented by Expression 1. Next, in the second time period after the time t2, the driving section 1430 drives the vibration actuator 1420 on the basis of the time constant (corresponding to the second time constant) corresponding to the capacitance Ctotal represented by Expression 2.

Thereby, in the first time period from the time 0 to the time t2, the voltage applied to the vibration actuator 1420 gradually increases in accordance with the first time constant as time passes.

Then, after the time t2, a substantially constant voltage is applied to the vibration actuator 1420.

Here, in order to describe the effects of the case of the embodiment shown in FIG. 15(*c*), referring to FIG. 16, a description will be given of a case where the driving section 1430 does not have the switch SW and the capacitor C, in contrast with the driving section 1430 of FIG. 15. In addition, in FIG. 16, the components corresponding to FIG. 15 are represented by the same reference numerals and signs, and the description thereof will be omitted.

Figure 16:
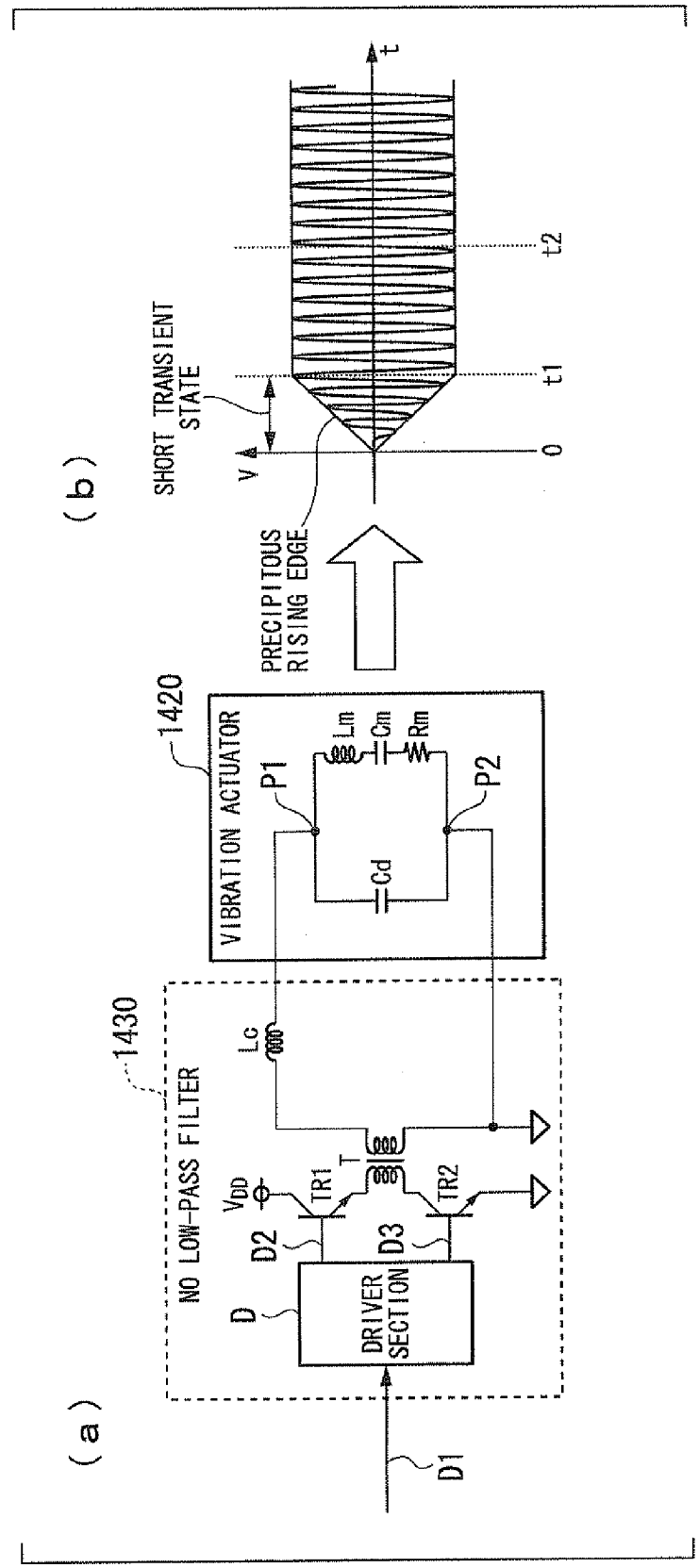
FIG. 16 is an explanatory diagram illustrating a configuration and an operation of a control device as a comparative object for describing effects of the configuration of the control device according to the same embodiment.

In the case of FIG. 16, the entire time period from the time 0, the driving section 1430 drives the vibration actuator 1420 on the basis of the time constant (corresponding to the second time constant) corresponding to the capacitance Ctotal represented by Expression 2.

Here, the value of the second time constant is smaller (shorter) than the value of the first time constant. Hence, as shown in FIG. 16(*b*), in the time period from the time 0 to the time t1 which is shorter than the time t2, the voltage applied to the vibration actuator 1420 gradually increases in accordance with the second time constant as time passes. Then, after the time t1, a substantially constant voltage is applied to the vibration actuator 1420.

As described above, in the case of FIG. 16(*b*), in the time period from the time 0 to the time t1 which is shorter than the time t2, the voltage applied to the vibration actuator 1420 gradually increases. Hence, in contrast with the case of FIG. 15(*c*), in the case of FIG. 16(*b*), the voltage applied to the vibration actuator 1420 is precipitous. Therefore, in the case of FIG. 16(*b*), in contrast with the case of FIG. 15(*c*), when the vibration actuator 1420 having the piezoelectric element is driven, sound is likely to be made.

That is, in contrast with the case of FIG. 16(*b*), in the case of FIG. 15(*c*), the voltage applied to the vibration actuator 1420 is gentle. Hence, in the case of FIG. 15(*c*), in contrast with the case of FIG. 16(*b*), it is possible to reduce the sound which is made when the vibration actuator 1420 having the piezoelectric element is driven.

As described with reference to FIGS. 15 and 16, when driving the piezoelectric element, the driving section 1430 drives the piezoelectric element by using the first time constant in the first time period, and drives the piezoelectric element by using the second time constant, of which a time constant value is smaller than that of the first time constant, in a second time period subsequent to the first time period. Thereby, at the initial stage (at the time of starting the driving) for driving the piezoelectric element of the vibration actuator 1420, it is possible to reduce unexpected application of current and a voltage to the piezoelectric element provided in the vibration actuator 1420. Hence, it is possible to reduce the sound which is made when the vibration actuator 1420 having the piezoelectric element is driven.

In addition, in the case of FIG. 15(*a*), in the state where the switch SW is turned on, the capacitor C is connected in parallel to the vibration actuator 1420. In this case, in terms of a circuit, a circuit of a capacitor-type low-pass filter system is inserted right before the vibration actuator 1420.

Accordingly, if the above description is differently expressed with reference to FIG. 15, in the above-mentioned first time period, the circuit of the low-pass filter system is inserted right before the vibration actuator 1420. In this case, the current i for driving the vibration actuator 1420 is transient current which is represented by the following Expression 3.

$$i = V\text{in}/R - (V\text{in}/R)e^{-(1/RC)t};$$ (Expression 3)

Here, Vin represents an input voltage, R represents a resistance (a resistance value of the equivalent resistance Rm) inside the circuit, C represents a capacitance (a value of the capacitance Ctotal), and t represents a time. The second term in Expression 3 represents transient current. Furthermore, in the second term, 1/RC corresponds to the time constant τ.

Here, as shown in FIG. 15(*a*), in the state where the switch SW is turned on, when the capacitor C is connected in parallel to the vibration actuator 1420, the current i for driving the vibration actuator 1420 becomes equal to the transient current based on the time constant τ1 (=R(Cd+C)) corresponding to Ctotal (=Cd+C) represented by Expression 1.

In addition, the driving section 1430 starts driving the vibration actuator 1420 in the state where the switch SW is turned on, and then after the time period which is twice the time constant τ1 has elapsed, the switch SW is turned off. That is, the time period, which is twice the time constant τ1, corresponds to the above-mentioned first time period.

In such a manner, in the time period (first time period) which is up to twice the time constant τ1, on the basis of the time constant τ1, the current i for driving the vibration actuator 1420 gradually reaches a steady-state value (Vin/R). Then, in the subsequent time period (second time period), the current i is based on the time constant τ2 (=RCd). Here, the speed, at which the vibration actuator 1420 is driven, is proportional to a value of the time constant relative to the current (or voltage) which is input to the vibration actuator 1420. Accordingly, in the second time period, the driving section 1430 promptly drives the vibration actuator 1420 in the case of the time constant τ2 (τ2<τ1) in contrast with the case of the time constant τ1.

Accordingly, the driving section 1430 is able to reduce the sound, which is made when the vibration actuator 1420 having the piezoelectric element is driven, in the first time period, and is able to promptly drive the vibration actuator 1420 in the second time period.

In addition, turning on and off of the switch SW may be controlled by the driving section 1430 in the following manner. For example, the driving section 1430 has a timer section that measures the time after the piezoelectric element starts to be driven by using the first time constant. In addition, when driving the piezoelectric element, the driving section 1430 drives the piezoelectric element by using the first time constant, and then when the time measured by the timer section is equal to or greater than the first time period, the driving section 1430 drives the piezoelectric element by using the second time constant. The first time period is, as described above, a time period corresponding to twice the time constant τ1.

Furthermore, for example, the driving section 1430 has a detection section that detects a control signal for causing the driving section 1430 to drive the piezoelectric element. In addition, when driving the piezoelectric element, the driving section 1430 drives the piezoelectric element by using the first time constant, and then when a signal level of the control signal detected by the detection section is equal to or greater than a predetermined value corresponding to the first time period, the driving section drives the piezoelectric element by using the second time constant.

For example, the detection section measures and detects the voltage applied to the vibration actuator 1420 as the control signal for causing the driving section 1430 to drive the piezoelectric element as shown in FIG. 15(c). In this case, as shown in FIG. 15(c), a voltage value at the time corresponding to twice the time constant τ1, or a voltage value (for example, a voltage value in the second time period), which reaches a steady-state value after the transient voltage passes, may be set as a predetermined value. In addition, the detection section may detect current. In this case, for example, the current of the first term (Vin/R) in Expression 3 may be set as a predetermined value.

In addition, in the above description, by turning the switch SW on and off, the capacitance value of the capacitor C, which is connected in parallel to the vibration actuator 1420, is changed. The invention is not limited to this, and for example, in place of the switch SW and the capacitor C, the variable capacitor may be used. In this case, the driving section 1430 changes the capacitance value of the variable capacitor such that the capacitance value of the variable capacitor becomes equal to a predetermined capacitance value in the first time period and the capacitance value becomes equal to 0 in the second time period. With such a configuration, the effects are taken as shown in the case of FIG. 15.

In addition, when driving the piezoelectric element, the driving section 1430 may drive the piezoelectric element by using the first time constant which is selected from a plurality of the first time constants of which time constant values are different, and then drives the piezoelectric element by using the second time constant.

For example, similarly to the switch SW and the capacitor C, a plurality of switches SW1 . . . SWn and a plurality of capacitors C1 . . . Cn (n is a natural number equal to or greater than 2) may be connected in parallel to the vibration actuator 1420. It is assumed that the plurality of capacitors C1 . . . Cn respectively have different capacitance values. In addition, any one switch of the plurality of switches SW1 . . . SWn is turned on in the above-mentioned first time period. Then, in the second time period, all the switches are turned off.

Furthermore, when the variable capacitor is used in place of the switch SW and the capacitor C, the driving section 1430 changes the capacitance value of the variable capacitor such that the capacitance value of the variable capacitor has a capacitance value, which is selected from the settable capacitance values, in the first time period and the capacitance value becomes equal to 0 in the second time period.

Thereby, for example, in the first time period, the rising edge of the voltage applied to the vibration actuator 1420 is made to be gentler or more precipitous, in contrast with the case of FIG. 15(c).

Here, in some cases, for example, when the photography mode of the image capturing apparatus 1100 is a mode of capturing a moving image, it may be preferable that it should be gentle, and when the mode is a mode of capturing a still image, it may be preferable that it should be precipitous. Even in such cases, with such a configuration, in accordance with the image capturing modes, it is possible to change the rising edge of the voltage applied to the vibration actuator 1420. Furthermore, in accordance with user's preference, it is possible to change the rising edge of the voltage applied to the vibration actuator 1420.

Furthermore, in the above description of FIG. 15, when the time constant in the case of driving the piezoelectric element is changed, the case of the configuration using the capacitor C was described. However, the configuration, in which the time constant is changed, is not limited to the configuration using the capacitor C. For example, a coil may be used, and a combination between the coil and the capacitor may be used.

In addition, the above description was given of the case where the lens barrel 1400 is interchangeably mounted on the image capturing apparatus 1100. However, the image capturing apparatus 1100 and the lens barrel 1400 may be configured as one body.

Hitherto, the embodiments of the invention has been described in detail with reference to the drawing, but a specific configuration is not limited to the embodiments, and includes design and the like which are made without departing from the technical scope of the invention.

What is claimed is:

1. A lens barrel comprising:
   a vibration actuator that drives at least one lens of a photographic optical system;
   an input section that inputs a set of driving signals to the vibration actuator;
   a phase shifting section that changes a phase difference of the set of driving signals; and
   a control section that executes first processing that causes the phase shifting section to perform an operation that reduces a magnitude of the phase difference while driving the lens in a first direction by the vibration actuator, and when a movement direction of the lens becomes a second direction, which is reversed with respect to the first direction, increases the magnitude of the phase difference while driving the lens in the second direction.

2. The lens barrel according to claim 1, further comprising:
   wherein frequencies of the set of the driving signals are determined depending on a movement speed of a subject.

3. The lens barrel of claim 1, further comprising:
   wherein when the signal for giving an instruction to drive the vibration actuator is input, before executing the first processing, the control section executes a second processing of changing amplitudes of the set of the driving signals to a predetermined first amplitude and applying it to the vibration actuator, and executes a third processing of causing the amplifying section to perform an operation which increases the corresponding amplitudes of the set of the driving signals up to a predetermined second amplitude greater than the corresponding first amplitude after the corresponding second processing while applying it to the vibration actuator, and
   wherein a time necessary for the third processing is longer than a time necessary for the second processing.

4. The lens barrel according to claim 3,
   wherein when stopping the vibration actuator, the control section causes the amplifying section to perform an operation which decreases the amplitudes of the set of the driving signals from the second amplitude to the first amplitude and then stops applying the corresponding set of driving signals.

5. The lens barrel according to claim 1,
   further comprising a detection section that detects a position of a focusing lens,
   wherein the control section determines whether or not a position of the focusing lens detected by the detection section is close to an in-focus position, if the focusing lens is positioned to be close to the corresponding in-focus position, the control section causes the phase shifting section to perform the operation which periodically changes the phase difference of the set of the driving signals.

6. The lens barrel according to claim 1,
   wherein a focusing lens is shifted in an optical axis direction of the corresponding focusing lens without rotation.

7. The lens barrel according to claim 1,
wherein, in a case of photographing a moving image, the control section causes the phase shifting section to perform the operation which periodically changes the phase difference of the set of the driving signals.

8. An image capturing apparatus comprising:
a vibration actuator that drives at least one lens of a photographic optical system;
an input section that inputs a set of driving signals to the vibration actuator;
a phase shifting section that changes a phase difference of the set of the driving signals; and
a control section that executes first processing that causes the phase shifting section to perform an operation that reduces a magnitude of the phase difference while driving the lens in a first direction by the vibration actuator, and when a movement direction of the lens becomes a second direction, which is reversed with respect to the first direction, increases the magnitude of the phase difference while driving the lens in the second direction.

9. The image capturing apparatus according to claim 8,
wherein, in a case of photographing a moving image, the control section causes the phase shifting section to perform the operation which periodically changes the phase difference of the set of the driving signals.

10. A lens barrel comprising:
a vibration actuator that drives at least one lens of a photographic optical system by a set of driving signals; a phase shifting section that changes a phase difference of the set of driving signal
a control section that reduces an absolute value of the phase difference of the set of driving signals while driving the at least one lens in a first direction by the vibration actuator, and after a movement direction of the at least one lens becomes a second direction, which is reversed with respect to the first direction, increases the absolute value of the phase difference of the set of driving signals while driving the at least one lens in the second direction.

* * * * *